United States Patent

Rathmann et al.

Patent Number: 5,960,435
Date of Patent: Sep. 28, 1999

[54] METHOD, SYSTEM, AND COMPUTER PROGRAM PRODUCT FOR COMPUTING HISTOGRAM AGGREGATIONS

[75] Inventors: Peter K. Rathmann, San Mateo; Eben M. Haber, Palo Alto, both of Calif.

[73] Assignee: Silicon Graphics, Inc., Mountain View, Calif.

[21] Appl. No.: 08/815,473

[22] Filed: Mar. 11, 1997

[51] Int. Cl.$^6$ .................................................. G06F 17/30
[52] U.S. Cl. ............................................ 707/101; 707/102
[58] Field of Search ............................... 707/1–4, 7, 101, 707/102

[56] References Cited

U.S. PATENT DOCUMENTS

| | | | |
|---|---|---|---|
| 3,816,726 | 6/1974 | Sutherland et al. | 235/152 |
| 4,719,571 | 1/1988 | Rissanen et al. | 364/300 |
| 4,868,771 | 9/1989 | Quick et al. | 364/578 |
| 4,928,247 | 5/1990 | Doyle et al. | 364/518 |
| 4,994,989 | 2/1991 | Usami et al. | 364/522 |
| 5,043,920 | 8/1991 | Malm et al. | 364/521 |
| 5,072,395 | 12/1991 | Bliss et al. | 364/443 |
| 5,150,457 | 9/1992 | Behm et al. | 395/120 |
| 5,164,904 | 11/1992 | Sumner | 364/436 |
| 5,201,047 | 4/1993 | Maki et al. | 395/600 |
| 5,247,666 | 9/1993 | Buckwold | 395/600 |
| 5,251,131 | 10/1993 | Masand et al. | 364/419.08 |
| 5,253,333 | 10/1993 | Abe | 395/62 |
| 5,282,262 | 1/1994 | Kurashige | 395/126 |
| 5,295,243 | 3/1994 | Robertson et al. | 395/160 |
| 5,307,456 | 4/1994 | MacKay | 395/154 |
| 5,325,445 | 6/1994 | Herbert | 382/38 |
| 5,418,946 | 5/1995 | Mori | 395/600 |
| 5,420,968 | 5/1995 | Johri | 395/133 |
| 5,426,780 | 6/1995 | Gerull et al. | 395/600 |
| 5,459,829 | 10/1995 | Doi et al. | 395/152 |
| 5,463,773 | 10/1995 | Sakakibara et al. | 395/600 |
| 5,519,865 | 5/1996 | Kondo et al. | 395/600 |
| 5,528,735 | 6/1996 | Strasnick et al. | 395/127 |
| 5,553,163 | 9/1996 | Nivelle | 382/227 |
| 5,555,354 | 9/1996 | Strasnick et al. | 395/127 |
| 5,604,821 | 2/1997 | Ranganathan et al. | 382/236 |
| 5,634,087 | 5/1997 | Mammone et al. | 395/24 |
| 5,659,731 | 8/1997 | Gustafson | 395/604 |
| 5,671,333 | 9/1997 | Catlett et al. | 395/20 |

(List continued on next page.)

OTHER PUBLICATIONS

Carlbom et al., "A Hierarchical Data Structure for Representing the Spatial Decomposition of 3–D Objects", *IEEE Computer Graphics & Applications,* Apr. 1985, pp. 24–31.

(List continued on next page.)

*Primary Examiner*—Maria N. Von Buhr
*Attorney, Agent, or Firm*—Sterne, Kessler, Goldstein & Fox P.L.L.C.

[57] ABSTRACT

A data record transformation that computes histograms and aggregations quickly for an incoming record stream. The data record transformation computes histograms and aggregations in one-step, thereby, avoiding the creation of a large intermediate result. The data record transformation operates in a streaming fashion on each record in an incoming record stream. Little memory is required to operate on one record or a few records at a time. According to a first embodiment, a method, system, and computer program product for transforming sorted data records is provided. A data transformation unit includes a binning module and a histogram aggregation module. The histogram aggregation module processes each binned and sorted record to form an aggregate record in a histogram format in one step. Data received in each incoming binned and sorted record is expanded and accumulated in an aggregate record for matching group-by fields. According to a second embodiment, a method, system, and computer program product for transforming unsorted data records is provided. An associative data structure holds a collection of partially aggregated histogram records. A histogram aggregation module processes each binned record to form an aggregate record in a histogram format in one step. Input records from the unordered record stream are matched against the collection of partially aggregated histogram records and expanded and accumulated into the aggregate histogram record having matching group-by fields.

18 Claims, 14 Drawing Sheets

U.S. PATENT DOCUMENTS

| | | | |
|---|---|---|---|
| 5,675,711 | 10/1997 | Kephart et al. | 395/22 |
| 5,675,785 | 10/1997 | Hall et al. | |
| 5,675,786 | 10/1997 | McKee et al. | |
| 5,680,476 | 10/1997 | Schmidt et al. | 382/159 |
| 5,694,524 | 12/1997 | Evans | 395/77 |
| 5,696,964 | 12/1997 | Cox et al. | 395/605 |
| 5,706,495 | 1/1998 | Chadha et al. | 707/2 |
| 5,724,573 | 3/1998 | Agrawal et al. | 395/606 |
| 5,727,199 | 3/1998 | Chen et al. | 395/606 |
| 5,732,230 | 3/1998 | Cullen et al. | 395/339 |
| 5,737,487 | 4/1998 | Bellegarda et al. | 395/25.9 |
| 5,748,852 | 5/1998 | Mahler | 395/61 |
| 5,787,274 | 7/1998 | Agrawal et al. | 395/613 |

OTHER PUBLICATIONS

Carlbom et al., "Planar Geometric Projections and Viewing Transformations" *Computing Surveys,* vol. 10, No. 4, Dec. 1978, pp. 465–502.

Beveaux, T., "Virtual Reality Gets Real", *New Media,* (Jan. 1993), pp. 32–35.

Graves, G.L., "NASA's Virtual Reality", *New Media,* (Jan. 1993), pp. 36–38.

Graves, G.L., "Invasion of the Digital Puppets", *New Media,* (Jan. 1993), pp. 38–40.

Yavelow, C., "3–D Sound Found In Space", *New Media,* (Jan. 1993), pp. 40–41.

Johnson, Brian and Ben Shneiderman, "Tree–Maps: A Space–Filling Approach to the Visualization of Hierarchical Information Structures", *IEEE Visualization Proceedings '91,* Oct. 1991, pp. 284–291.

Structural Dynamics Research Corporation News Release, "SDRC Announces Software Translator Between CADAM and I–DEAS", Mar. 31, 1992.

Jacobson, Bob, "The Ultimate User Interface", *BYTE,* Apr. 1992, pp. 175, 176, 178, 180, and 182.

Clarkson, Mark A., "An Easier Interface", *BYTE,* Feb. 1991, pp. 277, 278, 280, 281, and 282.

Radding, Alan, "PC GIS: Expect Gain But Also Some Pain", *Computerworld,* Feb. 17, 1992, p. 89.

Hilderbrand, Carol, "GIS Vital In Utility's Duel with Competitor", *Computerworld,* Jan. 20, 1992, p. 43.

Anthes, G.H., "GIS Eases Redistricting Worry", *Computerworld,* Oct. 7, 1991, p. 65.

Alexander, Michael, "GIS Sprouting Corporate Wings", *Computerworld,* Jul. 22, 1991, p. 20.

Wilder, C., "Virtual Reality Seeks Practicality", *Computerworld 26* (17), Apr. 27, 1992, p. 26.

Fairchild, Kim M., Steven E. Poltrock and George W. Furnas, "SemNet: Three–Dimensional Graphic Representations of Large Knowledge Bases", *Cognitive Science and its Applications for Human–Computer Interaction,* Guindon, Ed., 1988, pp. 201–233.

*Precision Visuals International Limited,* "Summary of PV–WAVE Point & Click Visual Data Analysis Software", 1991.

Flanagan, William G., "Cyberspace Meets Wall Street", *Forbes,* Jun. 22, 1992, pp. 164, 165, and 168.

Grinstein, G. et al., "Visualization for Knowledge Discovery", *Intl. J. Intelligent Systems 7,* 1992, pp. 637–648.

Fuller, J.E., Using Autocad, 3d Ed., Chapter 17, *Viewing 3–D Drawings,* 1989, pp. 17–1–17–14, and Tutorial, pp. 19–15–19–16, Delmar Publishers, Inc., Albany, NY 12212.

Alexander, M., "Visualizing Cleared–Off Desktops", *Computerworld 25* (18), May 6, 1991, p. 20.

Benedikt, M., ed., *Cyberspace First Steps,* The MIT Press, Cambridge, Massachusetts (1992), pp. 1–436.

Forrest, D., "Seeing Data in New Ways", *Computerworld,* Jun. 29, 1992, pp. 85–86.

Newquist, H.P., "Virtual Reality's Commercial Reality", *Computerworld 26* (3), pp. 93–95. No Date.

"Atlas Software: A New Dimension in Data Management", advertisement, Atlas Software, Strategic Mapping, Inc., San Jose, CA 95117 (page and date unknown).

"News: What's New—Business Software", *BYTE,* Mar. 1992, p. 78.

"A Map for All Reasons", advertisement, Strategic Mapping, Inc., San Jose, CA 95117 (page and date unknown).

News Release, Company: Information Builders, Dateline: Pacific Palisades, CA, "Remarkable 3D Main–Frame Graphics Available for PC Users", Feb. 1985.

News Release, Company: Information Builders, Inc., Dateline: Palm Desert, CA, "Information Builders Announces Release 3.0 of PC/Focus DBMS", Jun. 1, 1987.

News Release, Company: Honeywell Bull, Dateline: Bilerica, MA "Relational Software System Increases Integration, Productivity for Honeywell Bull Users", Jul. 17, 1987.

News Release, Company: Alliant Computer Systems, Dateline: San Diego, CA, "TGS' Figaro To Be Marketed With Silicon Graphics", Jul. 8, 1988.

News Release, Company: Alliant Computer Systems, Dateline: Atlanta, GA, "Alliant Debuts New Class of System The Visual Supercomputer", Aug. 2, 1988.

News Release, Company: Virtus, Dateline: Pleasanton, CA, "Individual Software Introduces Training for Microsoft Excel 3.0 Windows and Macintosh Versions", Jul. 31, 1991.

News Release, Company: Virtus Corporation, Dateline: Cary, NC, "Virtus Walkthrough Releases Quicktime Component", Nov. 1, 1991.

News Release, Company: Alias Research, Dateline: Toronto, Ontario, "Alias Ships Sketch!, Freeform 3D Illustration and Design Program", Nov. 15, 1991.

News Release, Company: Structural Dynamics Res. Intl. Business Machines, Dateline: Boston MA, "Alias Sketch (TM) Resumes Shipping: Freeform 3D Illustration and Design Tool", Feb. 19, 1992.

Pollack, A., "The 2–D Screen Gives 3–D World" New York Times (date unknown).

Foley et al., "Computer Graphics: Principals and Practice", Second Edition, Addison–Wesley Publishing Co., 1990, pp. 731–734 and color plate III.23.

Aha, D.W. et al., "Instance–Based Learning Algorithms," *Machine Learning,* vol. 6, No.1, pp. 37–66 (Jan. 1991).

Almuallim, H. and Dietterich, T.G., "Learning Boolean Concepts in the Presence of Many Irrelevant Features," *Artificial Intelligence,* vol. 69, Nos. 1–2, pp. 279–305 (Sep. 1994).

"Angoss Software Announces Knowledge Studio Data Mining Solution," http: //www.pathfinder.com/@@xIEkO-gYAVjbJZjKM/money/latest/press/PW/19970ct27/92, Angoss Software Corporation, pp. 1–2, Oct. 1997.

"Angoss Software's KnowledgeSeeker(TM) Compatible With SAS Institute," http://www.newswire.ca/releases/September1997/18/c3915.html, pp. 1–2, Canada Newswire, Sep. 1997.

Breiman et al., *Classification and Regression Trees,* Wadsworth International Group, entire book (1984).

Cestnik, B., "Estimating Probabilities: A Crucial Task in Machine Learning," *Proceedings of the 9th European Conference on Artificial Intelligence,* pp. 147–149 (Aug. 1990).

"Companies in Data Mining and Knowledge Discovery," http://kdnuggets.com/companies.html, pp. 1–4, Last updated: Oct. 31, 1997.

Cormen, T.H., et al., *Introduction to Algorithms*. The MIT Press, pp. 263–280 (1990).

Cover and Thomas, *Elements of Information Theory*, Wiley Interscience, entire book, 1991.

Dasarathy, B.V., "Nearest Neighbor (NN) Norms: (NN) Patterns Classification Techniques," (IBL), *IEEE Computer Society Press*, pp. 1–30 (1990).

"Data Mining and Knowledge Discovery References," http://kdnuggets.com/references.html, pp. 1–3, Last updated: Oct. 29, 1997.

Domingos, P. and Pazzani, M., "Beyond Independence: Conditions for the Optimality of the Simple Bayesian Classifier," *Machine Learning: Proceedings of the 13th International Conference* (ICML '96), pp. 105–112 (1996).

Duda, R. and Hart, P., *Pattern Classification and Scene Analysis*, Wiley, entire book, (1973).

Fairchild, K.M., "Information Management Using Virtual Reality-Based Visualizations," *Virtual Reality Applications and Explorations*, ed. A. Wexelblat, Academic Press, Inc., pp. 45–74, Copyright (1993), Publication date Jul. 1, 1993.

Fisher, R.A., "The use of multiple measurements in taxonomic problems," *Annals of Eugenics*, vol. 7., No. 1, pp. 179–188 (1936).

Friedman, J. H. et al., "Lazy Decision Trees," *Proceedings of the Thirteenth National Conference on Artificial Intelligence*, AAAI Press and the MIT Press, vol. 1, pp. 717–724 (1996).

Good, I.J., *The Estimation of Probabilities: An Essay on Modern Bayesian Methods*, pp. xi–xii, MIT Press, pp. 1–79, (1965).

"IBM Digs Deep for Data Mining Gold," http://www.software.ibm.com/data/intellimine/factsheet.html, pp. 1–8, IBM Corporation, Copyright 1997.

"KD Mine: Data Mining and Knowledge Discovery," http://kdnuggets.com/index_kdm.html, p. 1, Knowledge Discovery Nuggets, Copyright 1997, Last updated: Oct. 31, 1997.

Kittler, J., "Feature Selection and Extraction," *Handbook of Pattern Recognition and Image Processing*, Chapter 3, pp. 59–83, Academic Press, Inc., 1986.

Knuth, A., *The Art of Computer Programming*, Addison–Wesley, vol. 2, pp. 506–550 (1973).

W. Amsbury, Data Structures from Arrays to Priority Queues, Wadsworth Publishing Co., Belmont, CA, 1985, pp. 331–335.

C.J. Date et al., A Guide to SQL/DS, Addison–Wesley Publishing Co., NY, NY, 1989, pp. 97–118.

Hecht–Nielsen, R., *Neurocomputing*, Addison–Wesley Publishing, pp. 175–201, Jan. 1990.

Hsiao et al., "Supervised Textured Image Segmentation Using Feature Smoothing and Probabilistic Relaxation Techniques," *IEEE Transactions on Pattern Analysis and Machine Intelligence*, vol. 11, No. 12, pp. 1279–1292, Dec. 1989.

Robert et al., "Continuously Evolving Classification of Signals Corrupted by an Abrupt Change," *IEEE–IMS Workshop on information theory and statistics*, p. 97, Oct. 1994.

Santos–Victor et al., "A Computer Vision System for the Characterization and Classification of Flames in Glass Furnaces," *IEEE Transactions on Industry Applications*, vol. 29, No. 3, pp. 470–478, May/Jun. 1993.

Taxt et al., "Segmentation of Document Images," *IEEE Transactions on Pattern Analysis and Machine Intelligence*, vol. 11, No. 12, pp. 1322–1329, Dec. 1989.

Kohavi, R., "Scaling Up the Accuracy of Naive–Bayes Classifiers: a Decision–Tree Hybrid," In *Data Mining and Visulaization*, Silicon Graphics, Inc., from The Second International Conference on Knowledge Discovery and Data Mining (1996).

Kohavi, R., "A Study of Cross–Validation and Bootstrap for Accuracy Estimation and Model Selection," *Proceedings of the 14th International Joint Conference on Artifical Intelligence*, Stanford University, 1995.

Kohavi, R. and John, G., "Wrappers for Feature Subset Selection," http://robotics.stanford.edu/~{ronnyk.gjohn}, May 20, 1997.

Kohavi, R. and Li, C., "Oblivious Decision Trees, Graphs, and Top–Down Pruning," *Proceedings of the 14th International Joint Conference on Artificial Intelligence*, Chriss S. Mellish (Ed.), Morgan Kaufmann Publishers, Inc., pp. 1071–1077 (1995).

Kohavi, R. and Sommerfield, D., "Feature Subset Selection Using the Wrapper Model: Overfitting and Dynamic Search Space Topology," *Proceedings of the First International Conference on Knowledge and Discovery Data Mining*, pp. 192–197 (Aug. 1995).

Kohavi, R. et al., "Data Mining using MLC++: A Machine Learning Library in C++," *Tools With AI*, pp. 234–245 (1996).

Kononenko, I., "Inductive and Bayesian Learning in Medical Diagnosis," *Applied Artificial Intelligence*, vol. 7, pp. 317–337 (1993).

Langley, P. and Sage, S., "Induction of Selective Bayesian Classifiers," *Proceedings of the Tenth Conference on Uncertainty in Artificial Intelligence*, Morgan Kaufmann Publishers, Inc., pp. 399–406 (Jul. 1994).

Langley, P. and Sage, S., "Oblivious Decision Trees and Abstract Cases," *Working Notes of the AAAI–94 Workshop on Case–Based Reasoning*, AAAI Press, pp. 113–117 (1994).

Langley, P., et al., "An Analysis of Bayesian Classifiers," *Proceedings of the Tenth National Conference on Artificial Intelligence*, pp. 223–228 (Jul. 1992).

Lincoff, G., *National Audubon Society Field Guide to North American Mushrooms*, New York, pp. 9–32, (1981).

Mangasarian, O. L. and Wolberg, W. H., "Cancer Diagnosis Via Linear Programming," *SIAM News*, vol. 23, No. 5, pp. 1&18 (Sep. 1990).

Michie, et al., *Machine Learning, Neural and Statistical Classification*, Ellis Norwood United, entire book, (1994).

Murthy, S. et al., "Randomized induction of oblique decision trees," *Proceedings of the Eleventh National Conference on Artificial Intelligence*, AAI Press/MIT Press, pp. 322–327 (1993).

"Other Web Sites for Data Mining and Knowledge Discovery," http://kdnuggets.com/websites.html, pp. 1–3, Last updated: Sep. 10, 1997.

Quinlan, J.R., *C4.5: Programs for Machine Learning*, Morgan Kaufmann Publishers, Inc., pp. 17–26 (1993).

Quinlan, J.R., "Induction of Decision Trees," *Machine Learning*, vol. 1, No. 1, pp. 81–106 (1986).

Rendell, L. and Seshu, R., "Learning hard concepts through constructive induction: framework and rationale," *Computational Intelligence*, vol. 6, No. 4, pp. 247–270 (Nov. 1990).

"SAS Data Mining Solution," http://www.sas.com/software/data_mining/whitepapers/solution.html, pp. 1–6, SAS Institute Inc., Copyright 1997, Last Updated Sep. 26, 1997.

Schaffer, C., "A Conservation Law for Generalization Performance," *Machine Learning: Proceedings of the Eleventh International Conference,* Morgan Kaufmann Publishers, Inc., pp. 259–265 (1994).

Shavlik, J.W. and Dietterich, T.G. (Eds.), *Readings in Machine Learning,* Morgan Kaufmann Publishers, Inc., entire book, (1990).

"S*i*ftware: Tools for Data Mining and Knowledge Discovery," http://kdnuggets.com/siftware.html, pp. 1–2, Last updated: Oct. 31, 1997.

Thrun et al., "The Monk's Problems: A Performance Comparison of Different Learning Algorithms," *Technical Report CMU–CS–91–197,* Carnegie Mellon University pp. i–x and 1–112, (1991).

Utgoff, P., "Perceptron Trees: A Case Study in Hybrid Concept Representation," *Proceedings of the Seventh National Conference on Artificial Intelligence,* Morgan Kaufman, vol. 2, pp. 601–606 (Aug. 1988).

Weiss, S.M. and Kulikowski, C.A., *Computer Systems That Learn: Classification and Prediction Methods from Statistics, Neural Nets, Machine Learning, and Expert Systems,* Morgan Kaufmann Publishers, Inc., entire book, (1991).

MineSet User's Guide, Silicon Graphics Computer Systems, 1996, *made available to public less than one year prior to Mar. 11, 1997.*

Greenwood, J., "Countdown to the Cybermarket," Financial Post Magazine, Mar., 1994, pp. 26–32.

Boyl, J. et al., "Design of a 3D user interface to a database," submitted to Database Issues for Data Visualization Workshop, Jul., 1993, pp. 1–9.

Gershon, N. et al., "Visualization's New Tack: Making Sense of Information," IEEE Spectrum, Nov., 1995, pp. 38–47 and 55.

"Mineset Awards," http://www.sgi.com/Products/software/MineSet/awards.html, p. 1, (Jan. 9, 1998).

"Silicon Graphics MineSet Wins Bronze Miner Award," http://www.sgi.com/Headlines/1997/October/mineset_release.html, pp. 1–2, (Oct. 1, 1997).

"The 1997 Database Dozen," by D. Stodder, http://www.dbpd.com/96dozen.htm, pp. 1–2, (1996 or 1997).

"A Dozen Companies on the Rise," http://www.dbpd.com/seconddz.htm, pp. 1–9, (Miller Freeman Inc. 1997).

"MineSet 2.0 for Data Mining and Multidimensional Data Analysis," by C. Hall, http://www.sgi.com/Products/software/MineSet/DMStrategies/, pp. 1–12, (1997). (originally appeared in Sep. 1997 issue of *Data Management Strategies,* Copyright 1997 Cutter Information Corp.).

Ahlberg et al., "IVEE: An Information Visualization & Exploration Environment," Proceedings of Information Visualization '95, 1995, pp. 66–73.

Becker et al., "Smooth Transitions between Bump Rendering Algorithms," *Computer Graphics Proceedings,* Annual Conference Series, 1993, pp. 183–190.

Becker et al., "Unsteady Flow Volumes," *Proceedings of Visualization '95,* pp. 329–335, 1995.

Blinn, James F., "Light Reflection Functions for Simulation of Clouds and Dusty Surfaces," *Computer Graphics,* vol. 16, No. 3, Jul. 1982, pp. 116–124.

Crawfis et al., "Texture Splats for 3D Scalar and Vector Field Visualization," *Proceedings of IEEE Visualization '93,* 1993, pp. 261–265.

Crawfis et al., "Vector Field Visualization," *Computer Graphics and Applications,* vol. 14, 1994, pp. 50–56.

Inselberg et al., "Parallel Coordinates: A Tool for Visualizing Multidimensional Geometry," *Proceedings of Visualization '90,* pp. 361–378, 1990.

Laur et al., "Hierarchical Splatting: A Progressive Refinement Algorithm for Volume Renderng," *Computer Graphics,* vol. 25, No. 4, Jul. 1991, pp. 285–288.

Levoy, Marc, "Volume Rendering: Display of Surfaces from Volume Data," *IEEE Xomputer Graphics and Applications,* vol. 8, No. 5, May 1988, pp. 29–37.

Martin et al., "High Dimensional Brushing for Interactive Exploration of Multivariate Data," *Proceedings of Visualization '95,* 1995, pp. 271–278.

Max et al., "Bump Shading for Volume Textures," *IEEE Computer Graphics and Applications,* Jul. 1994, 18–20.

Max et al., "Flow Volumes for Interactive Vector Field Visualization," *Proceedings of Visualization '93,* 1993, pp. 19–24.

Sabella, Paolo, "A Rendering Algorithm for Visualizing 3D Scalar Fields," *Computer Graphics,* vol. 22, No. 4, Aug. 1988, pp. 51–58.

Stein et al., "Sorting and Hardware Assisted Rendering for Volume Visualization," *IEEE,* 1995, pp. 83–89.

Van Wijk et al., "HyperSlice," *Proceedings of Visualization '93,* 1993, pp. 119–125.

Westover, Lee, "Footprint Evaluation for Volume Rendering," *Computer Graphics,* vol. 24, No. 4, Aug. 1990, pp. 367–376.

Wilhelms et al., "A Coherent Projection Approach for Direct Volume Rendering," *Computer Graphics,* vol. 25, No. 4, Jul. 1991, pp. 275–284.

Wong et al., "Dual Multiresolution HyperSlice for Multivariate Data Visualization," *IEEE Symposium on Information Visualization,* Oct. 1996, pp. 74–75.

METHOD, SYSTEM, AND COMPUTER PROGRAM PRODUCT FOR COMPUTING HISTOGRAM AGGREGATIONS

CROSS-REFERENCE TO RELATED APPLICATIONS

This application is related to the following co-pending utility patent applications:

1. Sang'udi et al., "Computer-Related Method, System, and Program Product for Controlling Data Visualization in External Dimension(s)," application Ser. No. 08/748,548, (filed Nov. 12, 1996, and incorporated by reference in its entirety herein), pending.

2. Tesler, "Method, System and Computer Program Product for Visualizing Data Using Partial Hierarchies," Ser. No. 08/813,347, Attorney Docket No. 15-4-103.0151, 1452.0180003, (filed Mar. 7, 1997 and incorporated by reference in its entirety herein), pending.

3. Kohavi and Tesler, "Method, System and Computer Program Product for Visualizing a Decision Tree Classifier," Ser. No. 08/813,336, Attorney Docket No. 15-4-417.00, 1452.2220000, (filed Mar. 7, 1997 and incorporated by reference in its entirety herein), pending.

BACKGROUND OF THE INVENTION

1. Field of the Invention

The present invention relates generally to data record manipulation.

2. Related Art

Data mining and data visualization tools are called upon to handle ever increasing amounts of data. Databases or flat files can contain large data sets of records. The data records have different fields representing different data attributes or variables. In this way, the records can represent multivariate data sets. Depending upon the type of data involved, a data visualization is displayed to identify data content, characteristics, properties, relationships, trends, and any other aspect of the data. Many types of data visualizations are possible, such as, a scatter plot, geographical or map visualization, and a tree or hierarchy visualization.

Histograms are often used to summarize data records and attributes. A data record transformation unit is used to transform records into corresponding histograms. If data records are transformed into histogram format before performing aggregations on the data, the resulting calculation is costly and inefficient. Processing all records for a large gigabyte data set is slow and expensive.

SUMMARY OF THE INVENTION

The present invention provides a data record transformation that computes histograms and aggregations quickly for an incoming record stream. The data record transformation computes histograms and aggregations in one-step, thereby, avoiding the creation of a large intermediate result. The data record transformation operates in a streaming fashion on each record in an incoming record stream.

According to a first embodiment, a method, system, and computer program product for transforming sorted data records is provided. The data records are sorted on any one or more group-by fields. A data transformation unit includes a binning module and a histogram aggregation module. For each incoming record, the binning module bins numeric and/or categorical data attributes, as necessary.

The histogram aggregation module processes each binned and sorted record. The input binned and sorted record is matched with an aggregated histogram record, to check that it matches on all group-by fields. If so, values from the input record are accumulated into the aggregation result fields of the aggregation record. If not, the partially aggregated histogram record is written as output and then reinitialized with values from the input record. Little memory is required for the first embodiment since it only needs intermediate storage sufficient for recoding the values of one or a few histogram records.

According to a second embodiment, a method, system, and computer program product for transforming unsorted data records is provided. A data transformation unit includes a binning module and a histogram aggregation module. An associative data structure holds a collection of partially aggregated histogram records. For each incoming record, the binning module bins numeric and/or categorical data attributes, as necessary.

The histogram aggregation module processes each binned record. The input binned record is matched against the records in the associative data structure to see if any stored therein match it on all group-by fields. If such a matching record exists, values from the input record are accumulated into the aggregation result fields of the matching aggregation record. If not, the input record is used to initialize a new partially aggregated histogram record, which is added to the associative data structure. The second embodiment requires additional memory to store the associative data structure.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

1. Overview of the Invention

The present invention provides a data record transformation that computes histograms and aggregations quickly for an incoming record stream. The data record transformation computes histograms and aggregations in one-step, thereby, avoiding the creation of a large intermediate result. The data record transformation operates in a streaming fashion on each record in an incoming record stream. Little memory is required to operate on one record or a few records at a time.

The present invention provides a data manipulation tool for computing histogram aggregation roll-ups of an incoming stream of record-based data (sorted or unsorted). According to the present invention, histogram roll-ups are generated and defined in a separate operation and do not have to be defined in terms of other primitives. Histogram distribution and aggregation are combined into a single step. Processing is made simpler and more efficient as the creation of a large intermediate result is avoided.

2. Terminology

"Record" can be any type of data record having data attributes, and variables. Any type of data can be used, including but not limited to, business, engineering, science, and other applications. Data sets can be received as data records, flat files, relational or non-relational database files, direct user inputs, or any other data form.

"Binning" refers to any conventional process for assigning data values (numeric and/or categorical) into bins. Bins can be made up of uniform and/or non-uniform clusters of data points.

"Histogram" refers to a distributive representation of data attributes or variables.

3. Example Environment

The present invention is described in terms of an example data mining environment. Given the description herein, it would be obvious to one skilled in the art to implement the present invention in any general computer including, but not limited to, a computer graphics processor (single chip or multiple chips), high-end to low-end graphics workstations, virtual machine (e.g. Java-created application), and network architectures (e.g., client/server, local, intermediate or wide area networks). In one preferred example, the present invention can be implemented as software, firmware, and/or hardware in a data mining tool, such as, the MINESET product released by SILICON GRAPHICS, Inc., and executed on a graphics workstation manufactured by SILICON GRAPHICS, Inc. (e.g., an INDIGO2, INDY, ONYX, O2, or OCTANE workstation). A further example computer system and tool manager implementing the present invention is described below, but is not intended to limit the present invention.

Description in these terms is provided for convenience only. It is not intended that the invention be limited to application in this example environment. In fact, after reading the following description, it will become apparent to a person skilled in the relevant art how to implement alternative environments of the invention.

4. Data Transformation Using Histogram Aggregation

Figure 1:
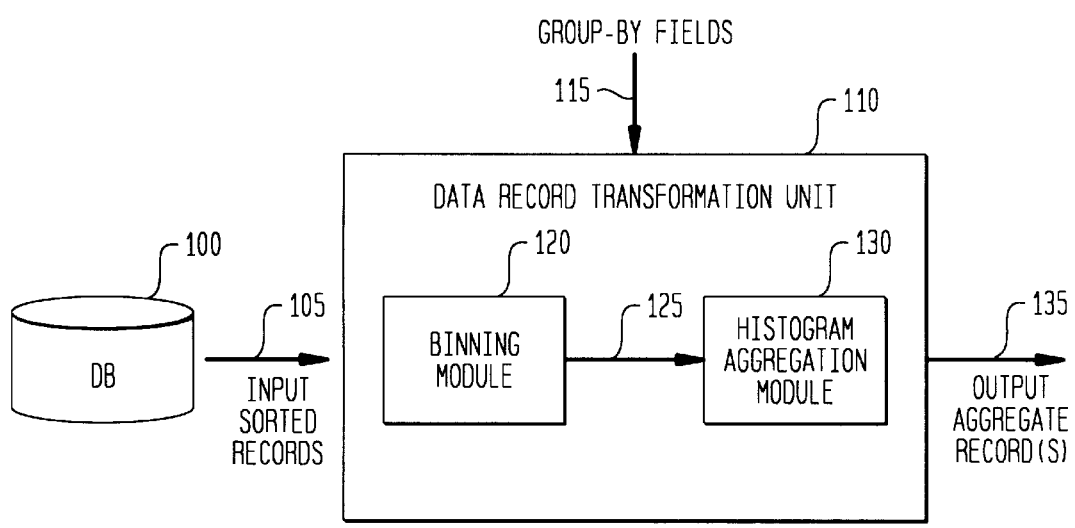
FIG. 1 is a block diagram of a data record transformation unit according to a first embodiment of the present invention.

According to a first embodiment, a method, system, and computer program product for transforming sorted data records is provided. As shown in FIG. 1, a data transformation unit 110 is coupled to a database 100. Database 100 can be any type of database (relation and/or non-relational) or flat file storage device. Data transformation unit 110 receives an incoming stream of sorted input records 105. For example, a database management system (not shown) can be used to sort the records. The data records are sorted on any one or more group-by fields.

Figure 3A:
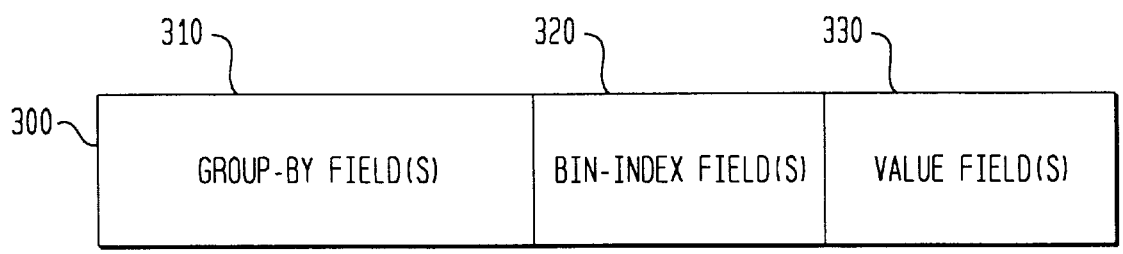
FIG. 3A is an example new data record, according to the present invention.

Data transformation unit 110 includes a binning module 120 and a histogram aggregation module 130. For each incoming record, binning module 120 bins numeric and/or categorical data attributes, as necessary. Any conventional binning technique (uniform or non-uniform) can be used to bin numeric (i.e. real-valued) attributes and categorical attributes. The bins themselves, i.e., the categories into which the values are grouped by the binning process, are enumerated and represented by integers. The output of the binning process, is a new field, called a bin-index field, containing these integers. A value field is a numeric field, containing the data which is to be aggregated. For example, individual incomes (represented by a value field in a collection of records) may be aggregated to give total or average income for a population. As shown in FIG. 3A, after binning, an input record 300 includes one or more group-by fields 310, bin-index field(s) 320, and value field(s) 330.

According to the present invention, histogram aggregation module 130 processes each binned and sorted record in a stream 125 output by binning module 120. Histogram aggregation module 130 processes each binned and sorted record in stream 125 to form an output aggegate record 135 in a histogram format. Data received in each incoming binned and sorted record in stream 125 is expanded and accumulated in an aggregate record for matching group-by fields 115. Expansion and aggregation by histogram aggregation module 130 is performed in one-step without calculation of an intermediate result. This aggregation can be any associative aggregation operation, including but not limited to, determining a sum, maximum, minimum, and/or count. Average may be synthesized from sum and count. Because of the streaming operation, histogram aggregation module 130 requires little memory only for processing one or a few records at a time.

Group-by fields 115 used in matching by histogram aggregation module 130 can be input from any input device and stored in a memory device (not shown) in data transformation module 110. According to one feature of the present invention described below, a graphical user-interface is used to define parameters for the operation of the histogram aggregation module 130, including defining the group-by fields 115 and the type of aggregation operation (sum, max, min, count, and average).

Figure 2:
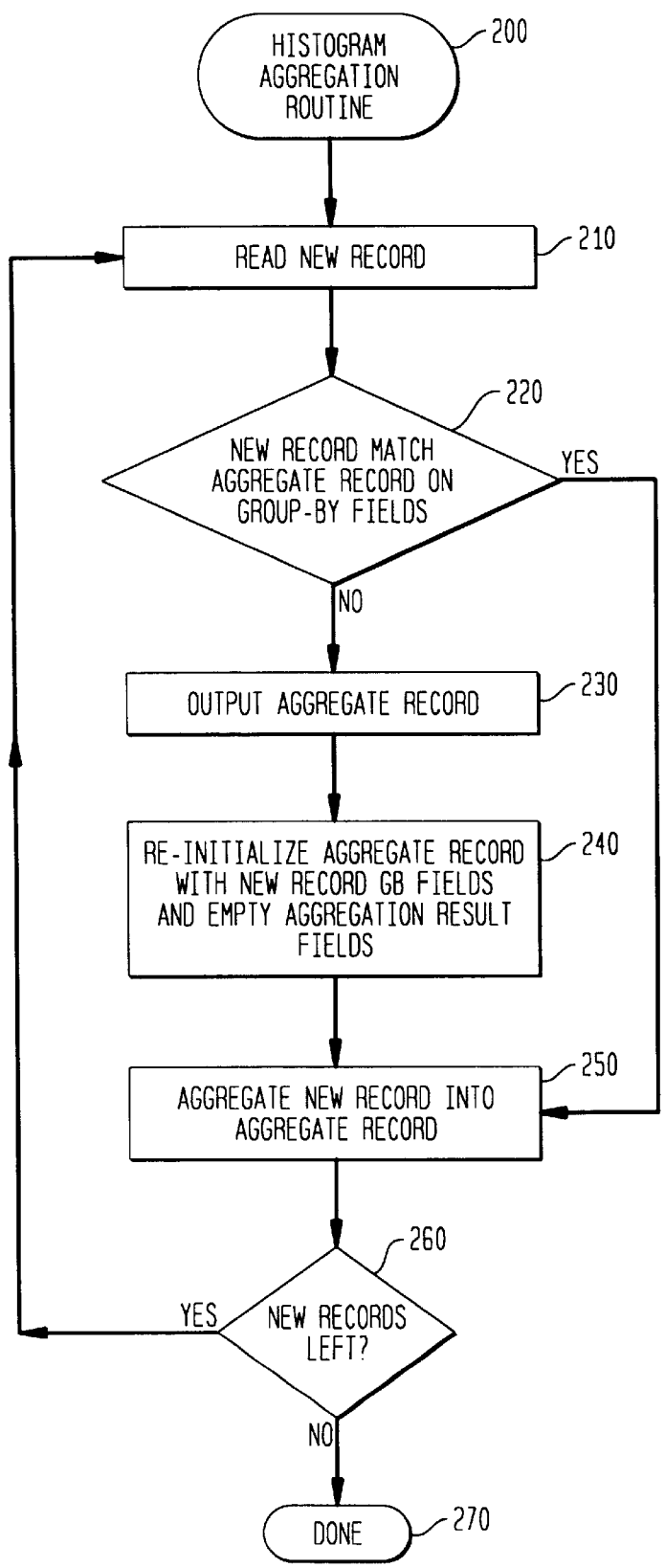
FIG. 2 is a flowchart of a histogram aggregation routine according to the first embodiment of the present invention.
Figure 3B:
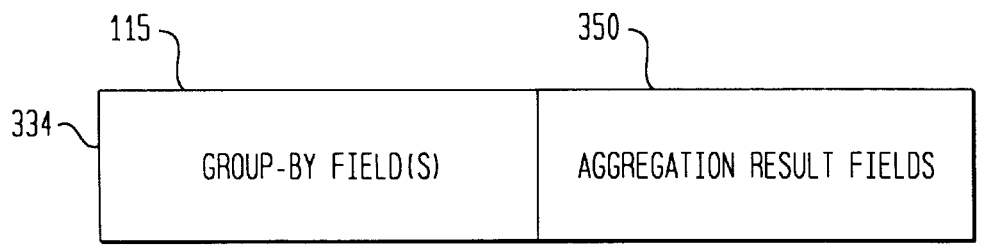
FIG. 3B is a diagram of an example aggregation record according to the present invention.

The operation of histogram aggregation module 130, according to the first embodiment of the present invention, is described in even further detail below with respect to FIGS. 2, 3A, and 3B. FIG. 2 is a flowchart of a histogram aggregation routine 200. In step 210, histogram aggregation module 130 reads a new record in stream 125. As shown in FIG. 3A, after binning, an input record 300 includes one or more group-by fields 310, bin-index field(s) 320, and value field(s) 330.

In step 220, new record 300 is compared to a stored aggregate record 334. As shown in FIG. 3B, aggregate record 334 has group-by fields 115 and aggregation result fields 350. The one or more group-by fields 310 in new record 300 are compared against group-by fields 115 in stored aggregate record 334 to determine if all match. Because the input record stream is sorted on the group-by fields, if a match does not occur, this means that the new record is the first to be seen with its pattern of group-by fields, and that the records which matched the old pattern of group-by fields (as stored in the histogram aggregation record) are now completely accumulated. Hence, the histogram aggregation record is written to the output record stream. Once the output has taken place, the histogram aggregation record is reinitialized (step 240). Accordingly, aggregate record 334 is re-initialized having group-by fields 115 from the new record and empty or null values in the aggregation result fields 350.

In step 250, when a match occurs in step 220 or after step 240, the new record 300 is aggregated into aggregate record 334. In particular, the bin-index fields 320 are used to determine the appropriate location within the aggregation result fields 350. This location is then updated to reflect the value field 330. In particular, if the desired aggregation is sum, the location is updated with the sum of its previous value and the value field 330. Any type of aggregation operation can be performed including, but not limited to, determining a sum, maximum, minimum, and count. Average may be synthesized from sum and count.

In step 260, a check is made for the next record in the sorted stream 125. Processing returns to step 210 until all records in stream 115 have been processed. When all records have been processed, the aggregation record 334, representing the last pattern of group-by fields in the input stream is output (step 270). This output aggregation record then includes group-by fields 115 along with aggregation result fields 350 which have values corresponding to an aggregation of data values.

Figure 4:
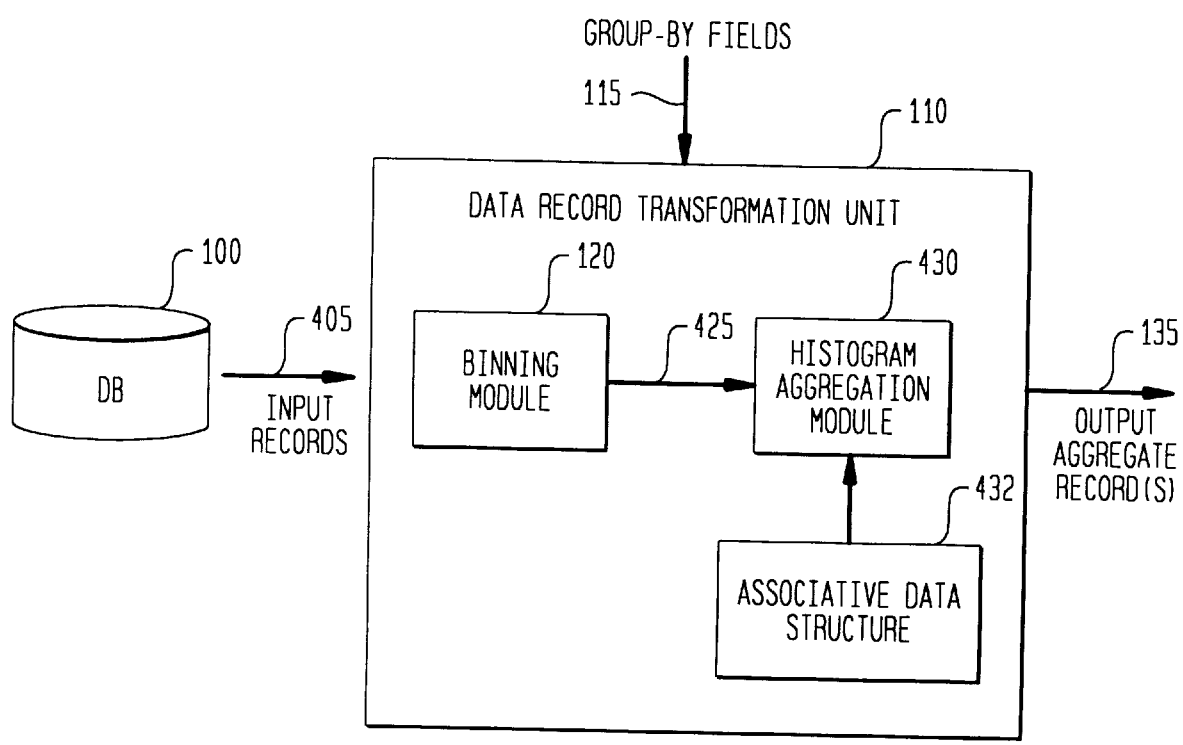
FIG. 4 is a block diagram of a data record transformation unit according to a second embodiment of the present invention.

According to a second embodiment, a method, system, and computer program product for transforming unsorted data records is provided. As shown in FIG. 4, data transformation unit 110 receives a stream of unsorted data records 405 from database 100. Data transformation unit 110 includes a binning module 120, as described above, and a histogram aggregation module 430. An associative data structure 432 holds a collection of partially aggregated histogram records. For example, an associative data structure can be efficiently implemented using any of a variety of well-known techniques such as a hash table (Knuth, The Art of Computer Programming, vol 2, pages 506–550, Addison-Wesley, 1973) (incorporated herein by reference) or a red-black tree (Cormen, Leiserson, and Rivest, Introduction to Algorithms (MIT Press, 1990)), from the Standard Template Library (Hewlett-Packard Company, 1994) (incorporated herein by reference).

For each incoming record 405, binning module 120 bins numeric and/or categorical data attributes, as necessary. Histogram aggregation module 430 processes each binned record output from binning module 120 in stream 425 to form an aggregate record in a histogram format in one step. Input records from the unordered record stream 425 are matched against the collection of partially aggregated histogram records in associative data structure 432. Data received in each incoming binned record in stream 425 is expanded and accumulated into the appropriate matching partially aggregated histogram record for matching group-by fields 115. Expansion and aggregation by histogram aggregation module 430 is performed in one-step without calculation of an intermediate result. This aggregation can be any type of aggregation including, but not limited to, determining a sum, maximum, minimum, and/or count. Average may be synthesized from sum and count.

Histogram aggregation module 430 may require substantially more memory than the corresponding module in the first embodiment, since the associative data structure can become large. However, the memory needed by the associative data structure is proportional to the size of the output, rather than the input data set. Since aggregation often dramatically reduces the size of a data set, this difference is a significant savings.

Figure 5:
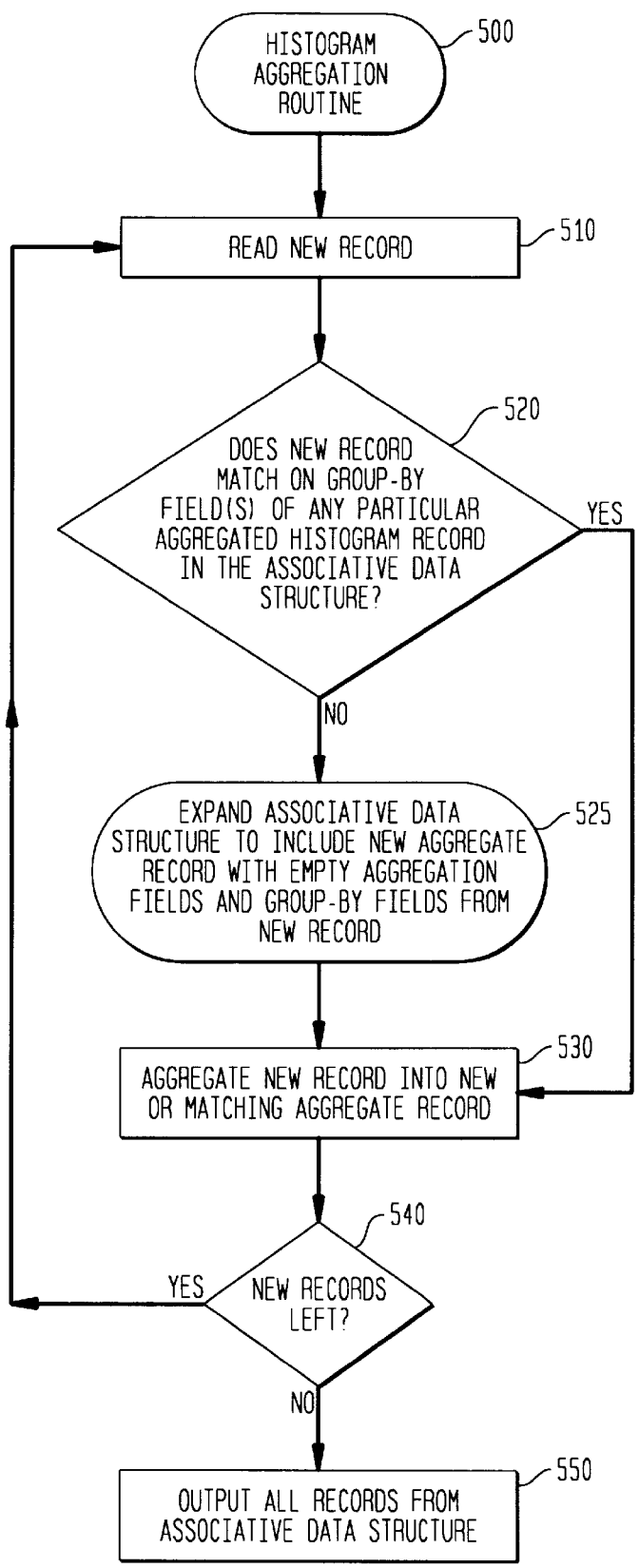
FIG. 5 is a flowchart of a histogram aggregation routine according to the second embodiment of the present invention.
Figure 6:
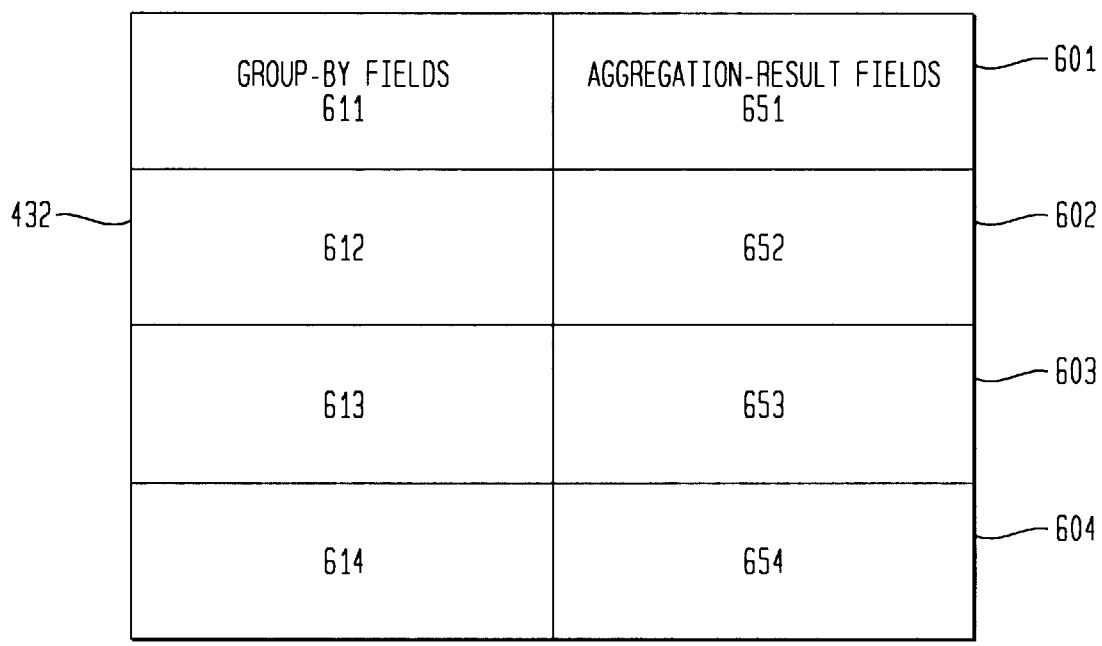
FIG. 6 is a diagram of an example associative data structure according to the second embodiment of the present invention.

The operation of histogram aggregation module 430, according to the second embodiment of the present invention, is described in even further detail below with respect to FIGS. 5 and 6. FIG. 5 is a flowchart of a histogram aggregation routine 500. In step 510, histogram aggregation module 430 reads a new record in stream 425. As shown in FIG. 3A, after binning, an input record 300 includes one or more group-by fields 310, bin-index field(s) 320, and value field(s) 330.

In step 520, new record 300 is compared against the collection of partially aggregated histogram records in associative data structure 432. As shown in FIG. 6, the associative data structure 432 has a collection of partially aggregated histogram records (601 to 604). For clarity, only four partially aggregated histogram records 601 to 604 are shown, however, the present invention is not so limited. In general, any number of partially aggregated histogram records may be stored. Partially aggregated histogram records 601 to 604 have corresponding group-fields 611–614 and aggregation result fields 651–654. Group-by fields 611 to 614 represent a distribution group-by fields 115.

The one or more group-by fields 310 in new record 300 are matched with the associative data structure to see if any of the contained records 601–604, have matching group-by fields 611 to 614. If no such match exists, the associative data structure is expanded to include a new partially aggregated histogram record, with group-by fields from the input record, and empty aggregation fields (step 525). This newly created record is then used as the matching partially aggregated histogram record. If a match does exist, the appropriate record (one of 601 to 604) is used as the matching partially aggregated histogram record to be passed on to step 530.

In step 530, when a match occurs in step 520, the new record 300 is aggregated into the appropriate partially aggregated histogram record 601, 602, 603 or 604. For example, if group-by fields 310 match group-by fields 611, then the new record 300 is aggregated into partially aggregated histogram record 601. The values in aggregation result field 651 are then updated based on an aggregation operation to include corresponding data values from value fields 330 in new record 300. As in step 250 in the first embodiment, the bin-index field(s) 320 can be used to determine which of the value(s) in aggregation result field 651 are to be updated. Any type of aggregation operation can be performed including but not limited to, determining a sum, maximum, minimum, count, and/or average.

In step 540, a check is made for the next record in the unsorted (or sorted) stream 425. Processing returns to step 510 until all records in stream 425 have been processed. When all records have been processed, the associative data structure is traversed, and each of the aggregated histogram records is output (step 550).

5. Example GUI Computer Environment

Figure 7:
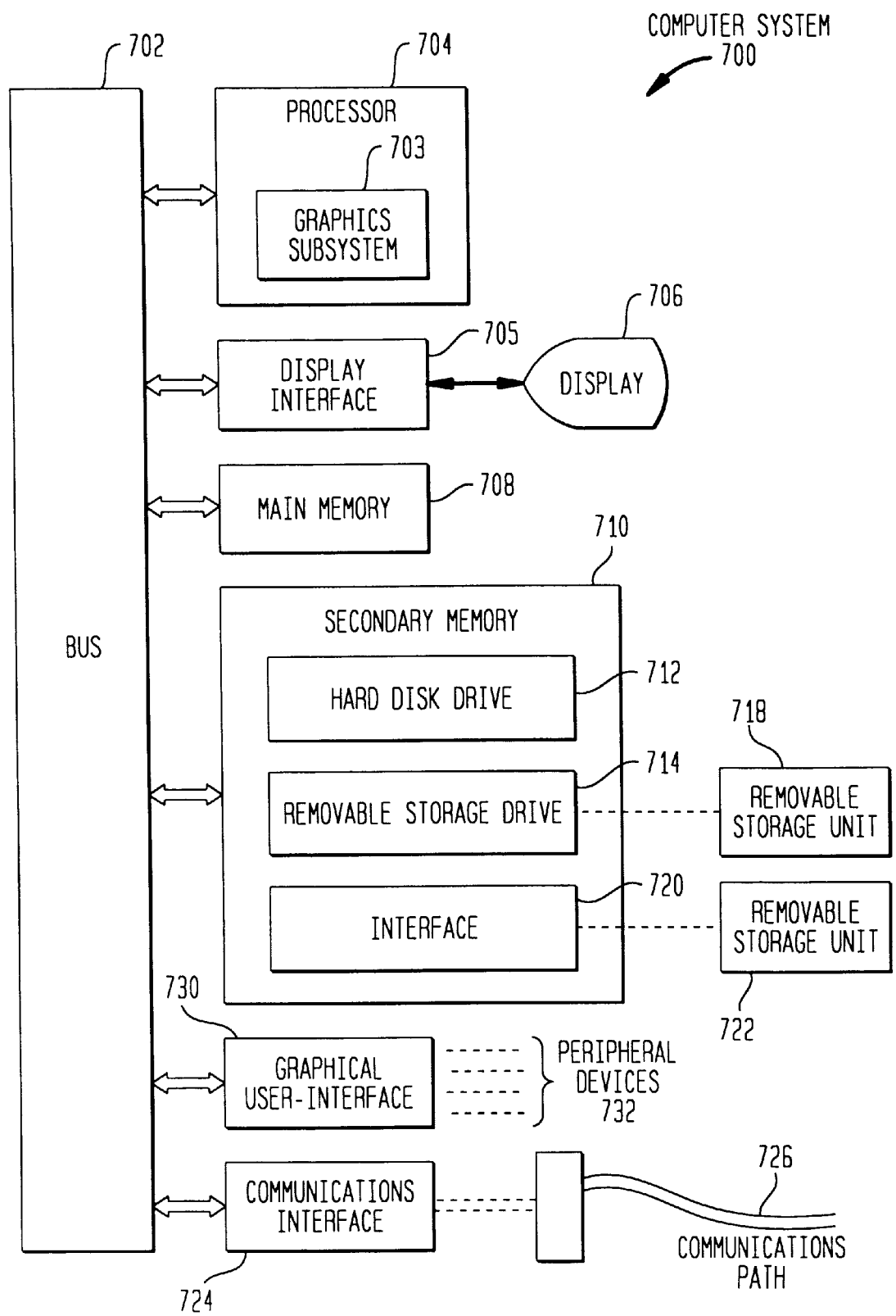
FIG. 7 is an example computer system for implementing the present invention.

FIG. 7 is a block diagram illustrating an example environment in which the present invention can operate. The environment is a computer system 700 that includes one or more processors, such as processor 704. The processor 704 is connected to a communications bus 702. Various software embodiments are described in terms of this example computer system. After reading this description, it will be apparent to a person skilled in the relevant art how to implement the invention using other computer systems and/or computer architectures.

Computer system 700 includes a graphics subsystem 703. Graphics subsystem 703 can be implemented as one or more processor chips. The graphics subsystem 703 can be included as part of processor 704, as shown, or as a separate graphics engine or processor. Graphics data is output from the graphics subsystem 703 to the bus 702. Display interface 705 forwards graphics data from the bus 702 for display on the display unit 706.

Computer system 700 also includes a main memory 708, preferably random access memory (RAM), and can also include a secondary memory 710. The secondary memory 710 can include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718 represents a floppy disk, magnetic tape, optical disk, etc., which is read by and written to by removable storage drive 714. As will be appreciated, the removable storage unit 718 includes a computer usable storage medium having stored therein computer software and/or data.

In alternative embodiments, secondary memory 710 may include other similar means for allowing computer programs or other instructions to be loaded into computer system 700. Such means can include, for example, a removable storage unit 722 and an interface 720. Examples can include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 can also include a communications interface 724. Communications interface 724 allows software and data to be transferred between computer system 700 and external devices via communications path 726. Examples of communications interface 724 can include a modem, a network interface (such as Ethernet card), a communications port, etc. Software and data transferred via communications interface 724 are in the form of signals which can be electronic, electromagnetic, optical or other signals capable of being received by communications interface 724, via communications path 726. Note that communications interface 724 provides a means by which computer system 700 can interface to a network such as the Internet.

Graphical user interface module 730 transfers user inputs from peripheral devices 732 to bus 706. These peripheral devices 732 can be a mouse, keyboard, touch screen, microphone, joystick, stylus, light pen, or any other type of peripheral unit. These peripheral devices 732 enable a user to operate and control the data visualization tool of the present invention as described above.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present invention is preferably implemented using software running (that is, executing) in an environment similar to that described above with respect to FIG. 7. In this document, the term "computer program product" is used to generally refer to removable storage unit 718 or a hard disk installed in hard disk drive 712. These computer program products are means for providing software to computer system 700.

Computer programs (also called computer control logic) are stored in main memory and/or secondary memory 710. Computer programs can also be received via communications interface 724. Such computer programs, when executed, enable the computer system 700 to perform the features of the present invention as discussed herein. In particular, the computer programs, when executed, enable the processor 704 to perform the features of the present invention. Accordingly, such computer programs represent controllers of the computer system 700.

In an embodiment where the invention is implemented using software, the software may be stored in a computer program product and loaded into computer system 700 using removable storage drive 714, hard drive 712, or communications interface 724. Alternatively, the computer program product may be downloaded to computer system 700 over communications path 726. The control logic (software), when executed by the processor 704, causes the processor 704 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

6. Example Data Network Environment

Figure 8:
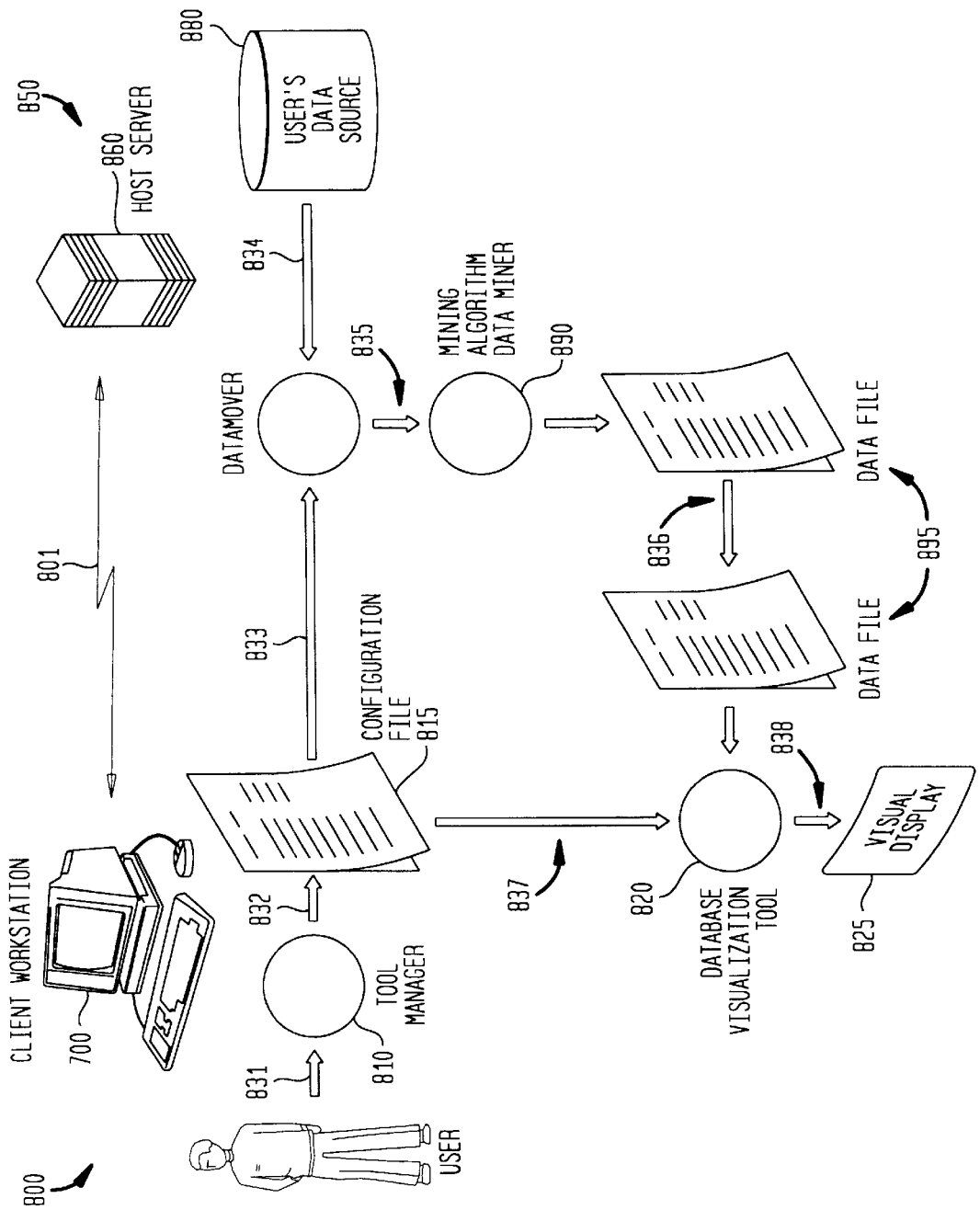
FIG. 8 is an example client-server data-mining architecture implementing the present invention.

FIG. 8 further illustrates an overall client/server network environment in which a data mining tool according to the present invention operates. The network environment described herein is illustrative only and is not necessary to practicing the present invention.

A client workstation 800 communicates over a data link 801 with a host server 850 as part of a local area network (LAN), campus-wide network, wide-area-network (WAN), or other network type configuration. Any data communication protocol can be used to transport data.

The client workstation 800 includes a computer system 700 as described above with respect to FIG. 7. The computer system 700 runs a graphical user-interface tool manager 810 for managing operation of a data visualization tool 820 output on visual display 825. Preferably, tool manager 810 and data visualization tool 820 are software modules executed on computer system 700. The host system 850 includes a host processor 860 and a data source 880. Data mover 870 and data miner 890 are included at the host server 850, and preferably, are implemented in software executed by the host processor 860.

FIG. 8 further illustrates the flow of a data visualization tool execution sequence through steps 831–837. First, a user logs onto the client workstation 800 and opens tool manager 810 (step 831). Through the tool manager 810, the user can select and configure any data visualization tool. A configuration file 815 must be set which identifies the content to be displayed in a data visualization. Tool manager 810 then generates a configuration file 815 defining the content of the data visualization and scope of external dimension space (step 832). To facilitate this process, predefined preference panels, templates and/or data palettes can be accessed through menu-driven commands and pop-up display windows to permit the user to easily define the content of a data visualization.

The configuration file 815 is sent over data link 801 to the host server 850 (step 833). A copy of the configuration file 815 is also stored at the client workstation 800 for use by the data visualization tool 825 (step 837). At the host server 850, the data mover 870 extracts data from the data source 880 corresponding to the configuration file 815 (step 834). The data miner 890 receives extracted data from the data mover 870 and generates a data file 895 (step 835). Data miner 890 then sends the data file 895 to the client workstation 800 (step 836).

Finally, in step 838, the data visualization tool 820 uses the data file 895 to generate a data visualization. Any type of data visualization tool can be used, including but not limited to, a visualization tool in the MINESET product manufactured by SILICON GRAPHICS, Inc. For example, scatter and map data visualization tools can be used as described in the application by Sang'udi et al., "Computer-Related Method, System, and Program Product for Controlling Data Visualization in External Dimension(s)," application Ser. No. 08/748,548, (filed Nov. 12, 1996, and incorporated by reference in its entirety herein), pending. A tree visualization tool can be used as described in the application by Joel D. Tesler, "Method, System and Computer Program Product for Visualizing Data Using Partial Hierarchies," Ser. No. 08/813,347, Attorney Docket No. 15-4-103.0151, 1452.0180003, (filed Mar. 7, 1997 and incorporated by reference in its entirety herein), pending. A decision tree classifier visualization tool can be used as described in the application by Kohavi and Tesler, "Method, System and Computer Program Product for Visualizing a Decision Tree Classifier," Ser. No. 08/813,336, Attorney Docket No. 15-4-417.00, 1452.2220000, (filed Mar. 7, 1997 and incorporated by reference in its entirety herein), pending.

According to a further feature of the present invention, a graphical-user-interface is used to provide parameters for data transformation involving histogram aggregation. The graphical user-interface for data transformation is provided in tool manager 810. In particular, a data transformation panel is displayed to permit a user to select and define parameters for configuring the binning module 120 and histogram aggregation modules 130, 430, as described above. An example data record transformation panel 920 is described below with respect to FIGS. 9A to 9C. Data record transform panel 920 allows binning to be defined by selecting a Binning button 922 which opens binning panels. Example binning panels for defining binning parameters are shown in FIGS. 10A and 10B.

Figure 11:
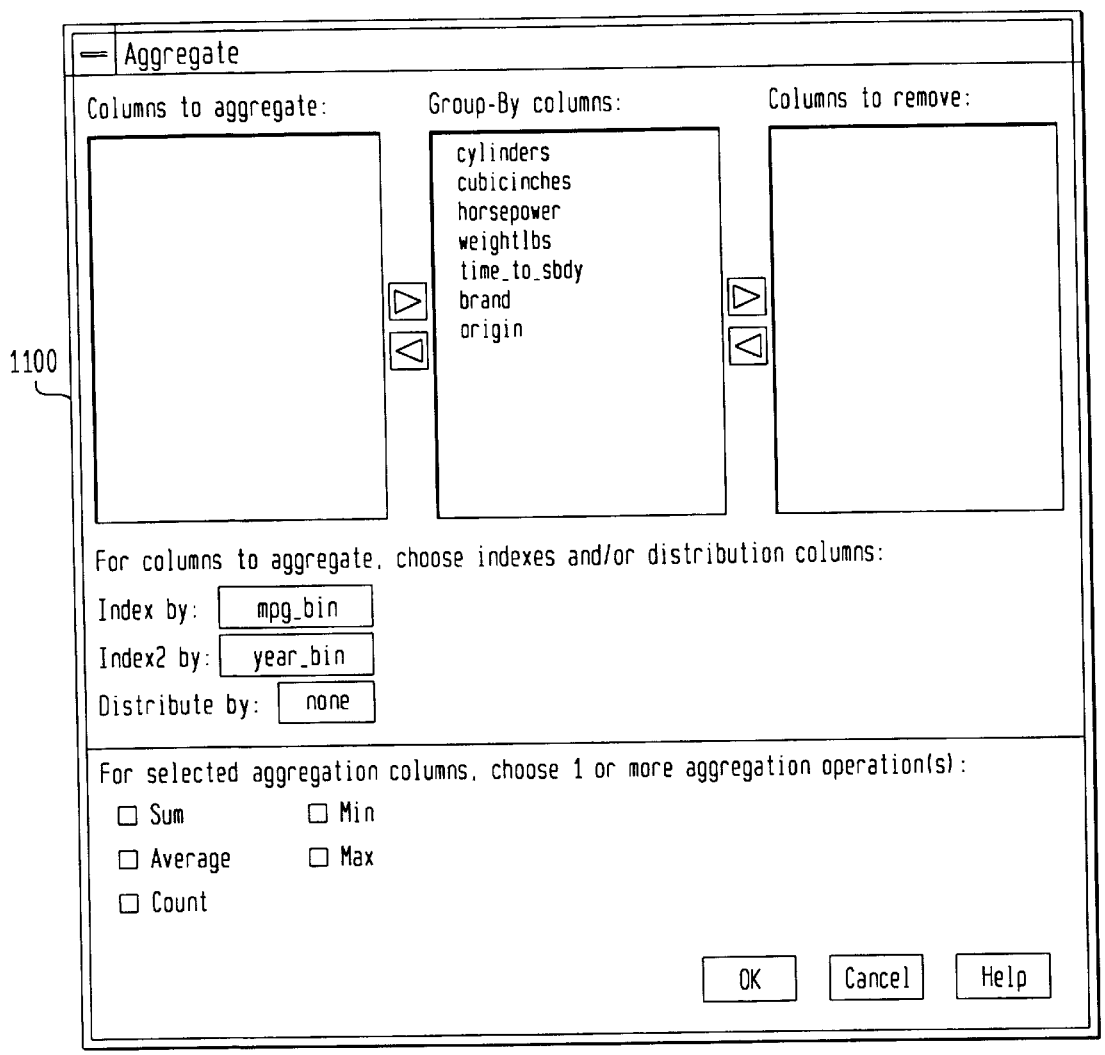
FIG. 11 is a display view of an aggregation panel used in the tool-manager of FIGS. 9A to 9C.

Data record transform panel 920 allows histogram aggregation to be defined by selecting an Aggregate button 923 which opens an aggregation panel. An example aggregation panel for defining histogram aggregation parameters is shown in FIG. 11.

Figure 9A:
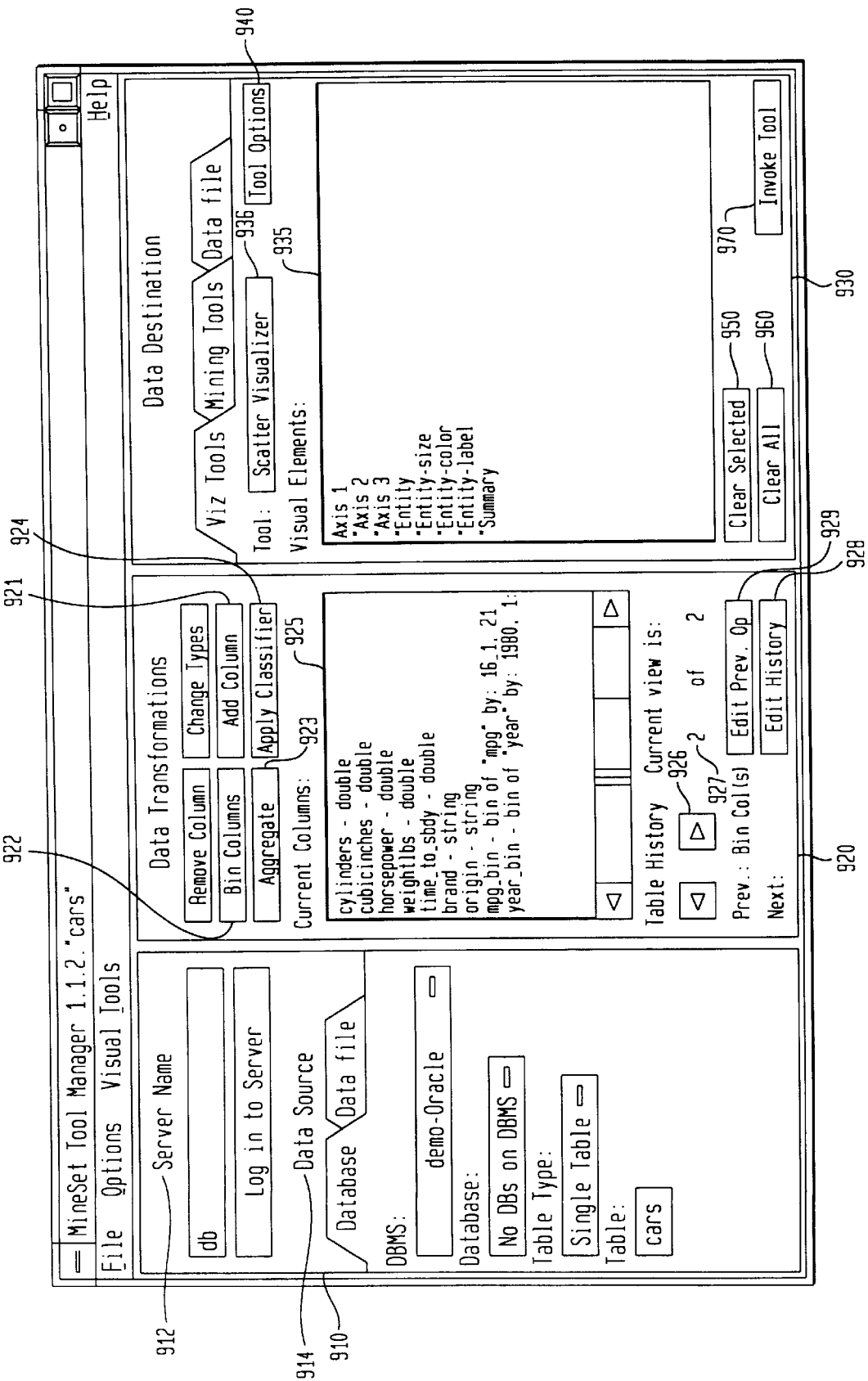
FIGS. 9A, 9B, and 9C are display views for a tool-manager graphical user interface implementing the present invention.
Figure 10A:
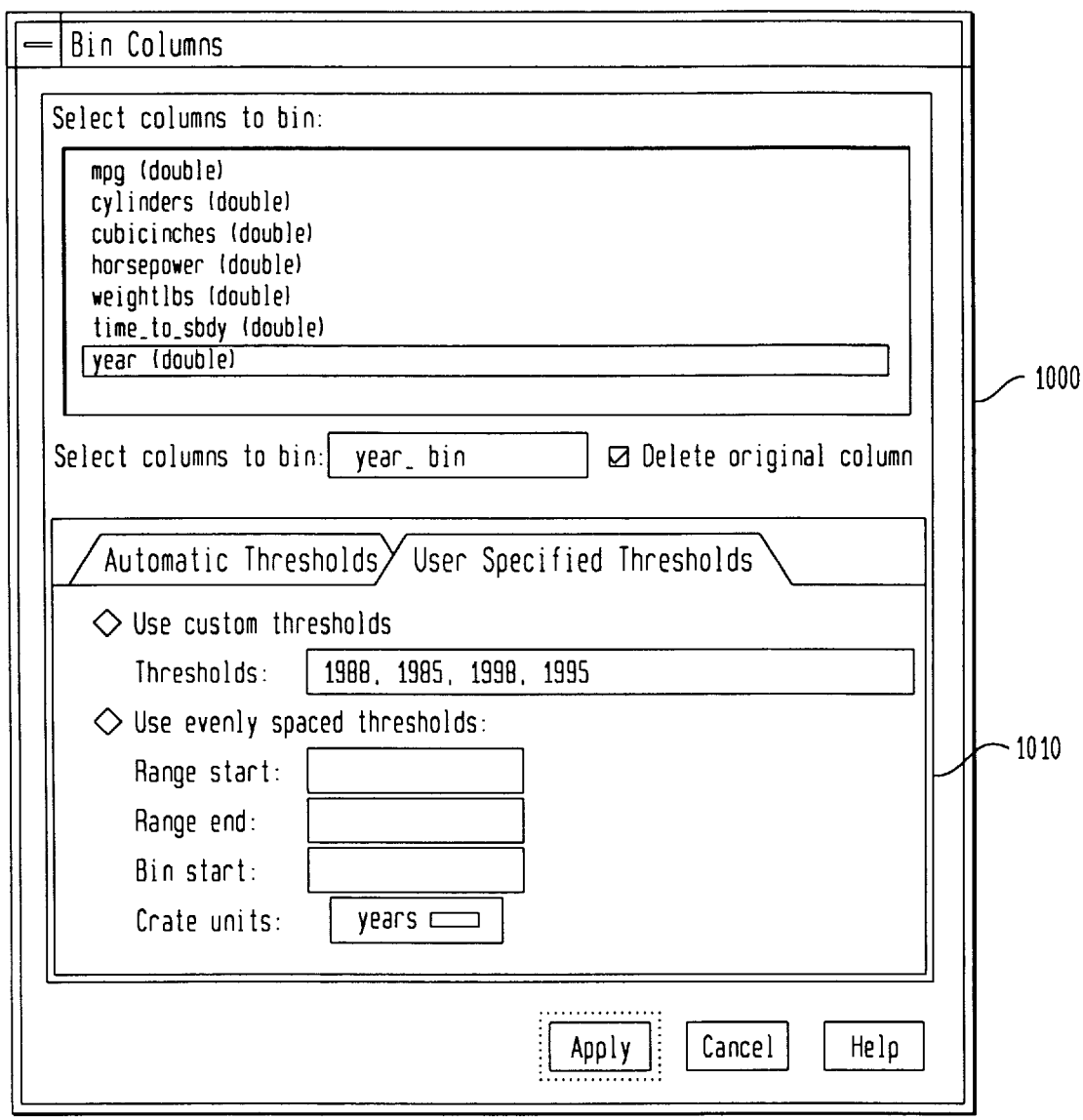
FIGS. 10A and 10B are display views of binning panels used in the tool-manager of FIGS. 9A to 9C.
Figure 10B:
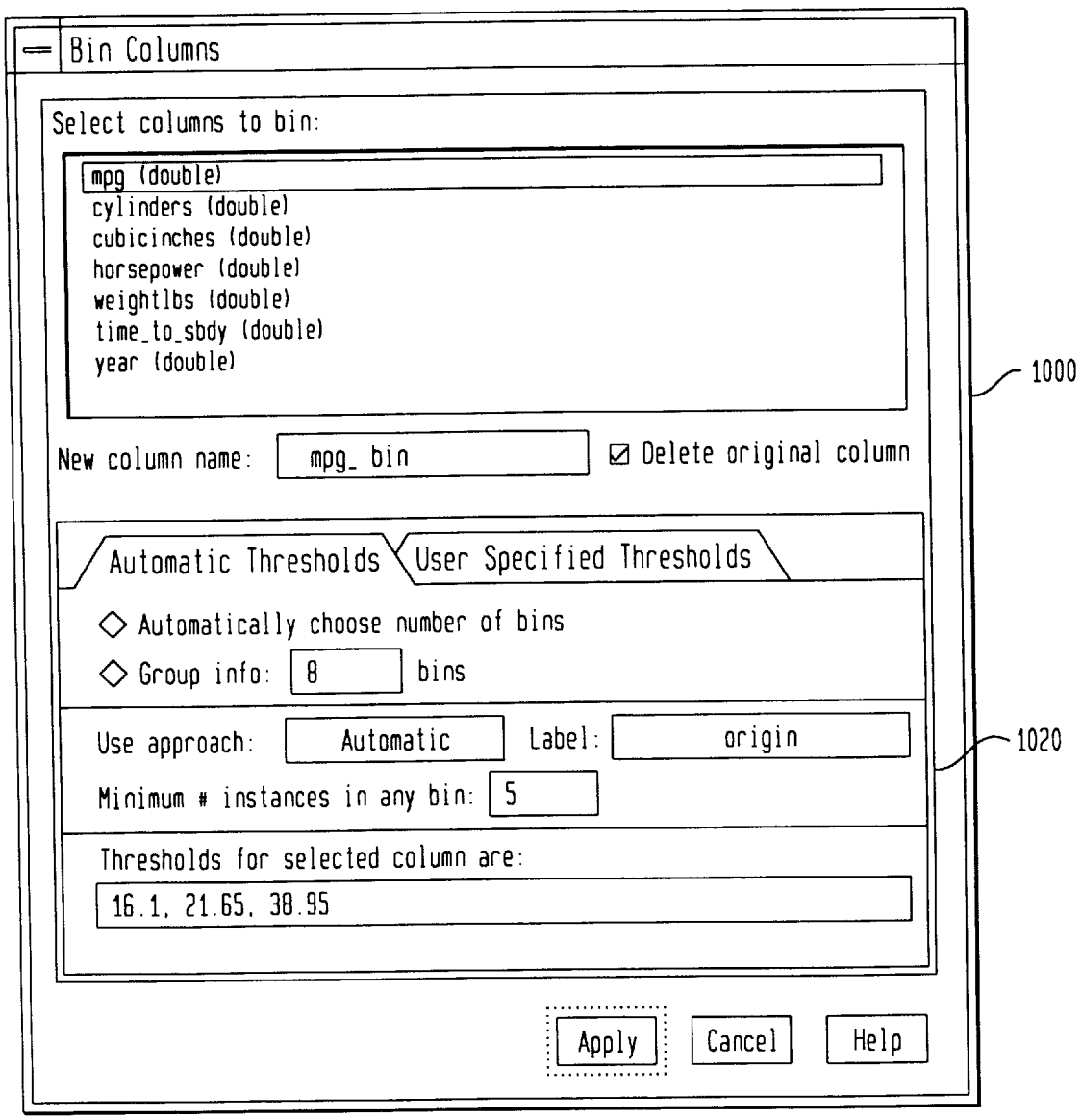

FIG. 9A shows data manipulation panels 910, 920, 930 that permit a user to construct a configuration file 815 by defining mapping requirements for data in a scatter data visualizer. For brevity, only main functions of panels 910–930 are highlighted here. Other functions can be added as would be obvious to one skilled in the art given this description.

In panel 910, server name window 912 identifies a server name containing data to be analyzed. Data source window 914 identifies particular database management systems, databases and data files to used in a data visualization.

Data record transformation panel 920 is used to define data transformations to be performed on the data before mapping the data to visual elements. Most operations are applied to columns of data. For example, Add Column option 921 lets a user create a new column based on other columns. Bin Columns option 922 is a data transformation where numerical values in a column are grouped into ranges, e.g., grouping ages into 5-year age groups. Other data transformation operations such as aggregating or classifying data, data ranges, or columns of data can be performed (options 923, 924). Current Columns window 925 lists the columns available for mapping to visual elements after the current data transformations have been applied. Initially, this is the set of columns in the original data. The selected data transformations can add, remove, or modify one or more columns.

Successive data transformations form a "history." The Table History arrow buttons 926 let a user move back and forth in this history. Current Columns window 925 and Current View indicator 927 reflect a user's current position in the table history. Edit History option 928 brings up a new window where the entire history is displayed visually allowing edits, insertions, or removal of data transformations. Edit Prev Op option 929 lets a user edit the previous transformation.

Data destination panel 930 includes a window 935. Window 935 lists visual elements requiring mapping. For a scatter plot, these visual elements include items defining axes, entities, and summary information. Optional items are preceded by an asterisk. Axis 1 lets a user assign a dependent variable to a first axis displayed in a scatter data visualization. Assigning a second dependent variable to a second axis (Axis 2) produces a 2-D chart. Assigning a third dependent variable to a third axis (Axis 3) produces a 3-D chart. Entity is an item used to uniquely identify the entities in the scatter data visualization. Entity-size, entity-color, and entity-label are items used to define data represented by graphical attributes of the entities. The summary item is used to define the data attribute or combination of data attributes representing the summary information in a summary window. For example, a scatter data visualization can be set-up through data panels 910–930 by assigning miles per gallon (mpg) to Axis 1 and cylinder to Axis 2.

Control buttons 936–970 are also included in data destination panel 930. Button 936 indicates the scatter data visualization tool is invoked. Tool Options button 940 displays the an options dialog box for configuring the scatter visualizer. Clear Selected Mapping button 950 clears a selected axis, entity, or summary data assignment mapping. Clear All Mapping button 960 clears all axis, entity, and summary mapping data assignments. Invoke Tool button 970 can be pressed after a configuration file is saved to see the scatter data visualization corresponding to the saved configuration file.

While panels 910–930 reduce the work in creating a configuration file, a configuration file 815 can be constructed manually using a text editor.

Figure 9B:
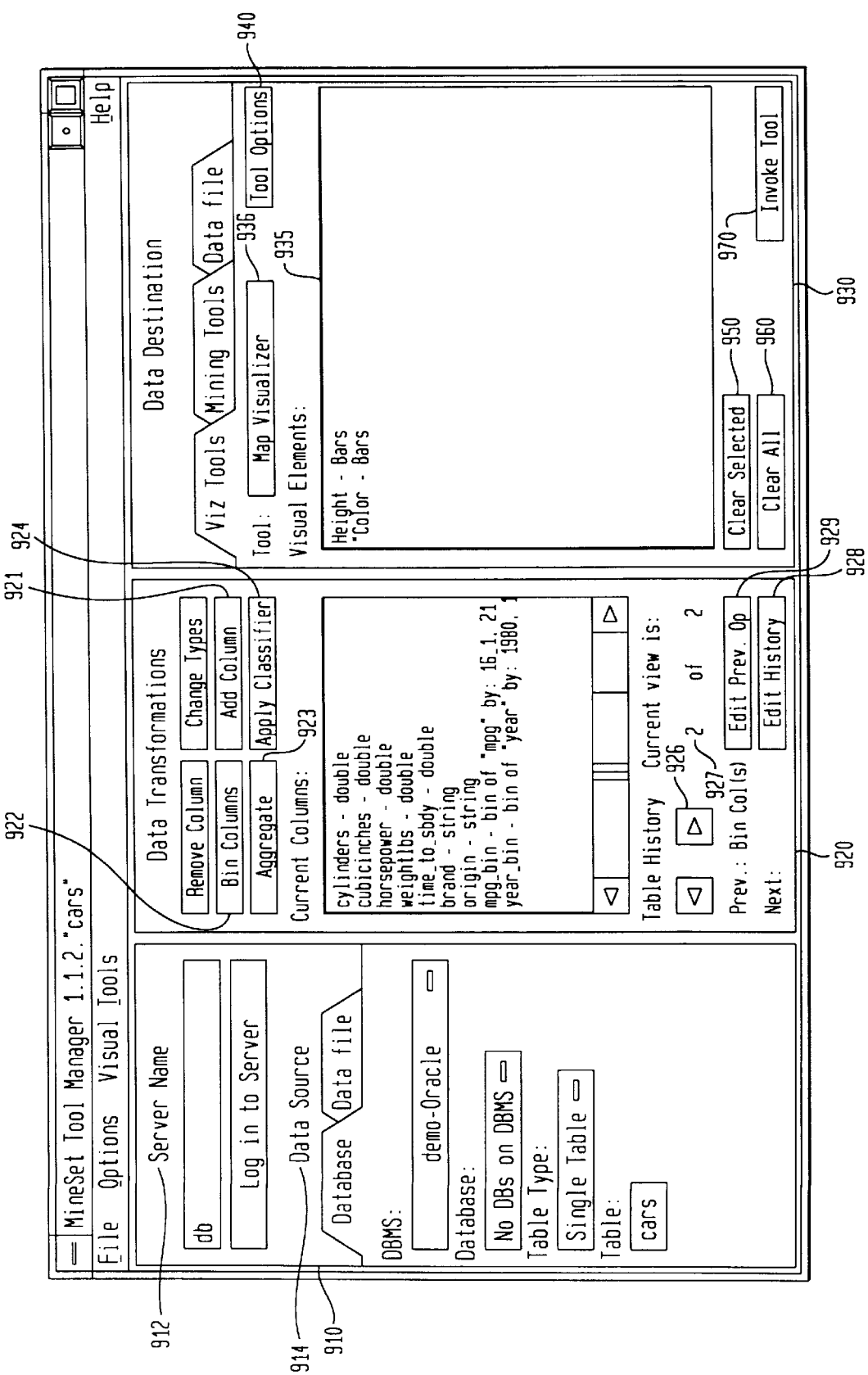

FIG. 9B shows data record transform panel 920 used with data destination panel 930 in which a map visualizer is selected. The visual elements window 935 then lists the one or more graphical attributes (e.g. height of bars and color of bars) associated with objects in a map data visualization. Optional items are preceded by an asterisk. For example, clicking Height-Bars lets a user specify the heights of geographic bars on a map data visualization. Clicking Color-Bars lets a user assign colors to the geographic bars.

Figure 9C:
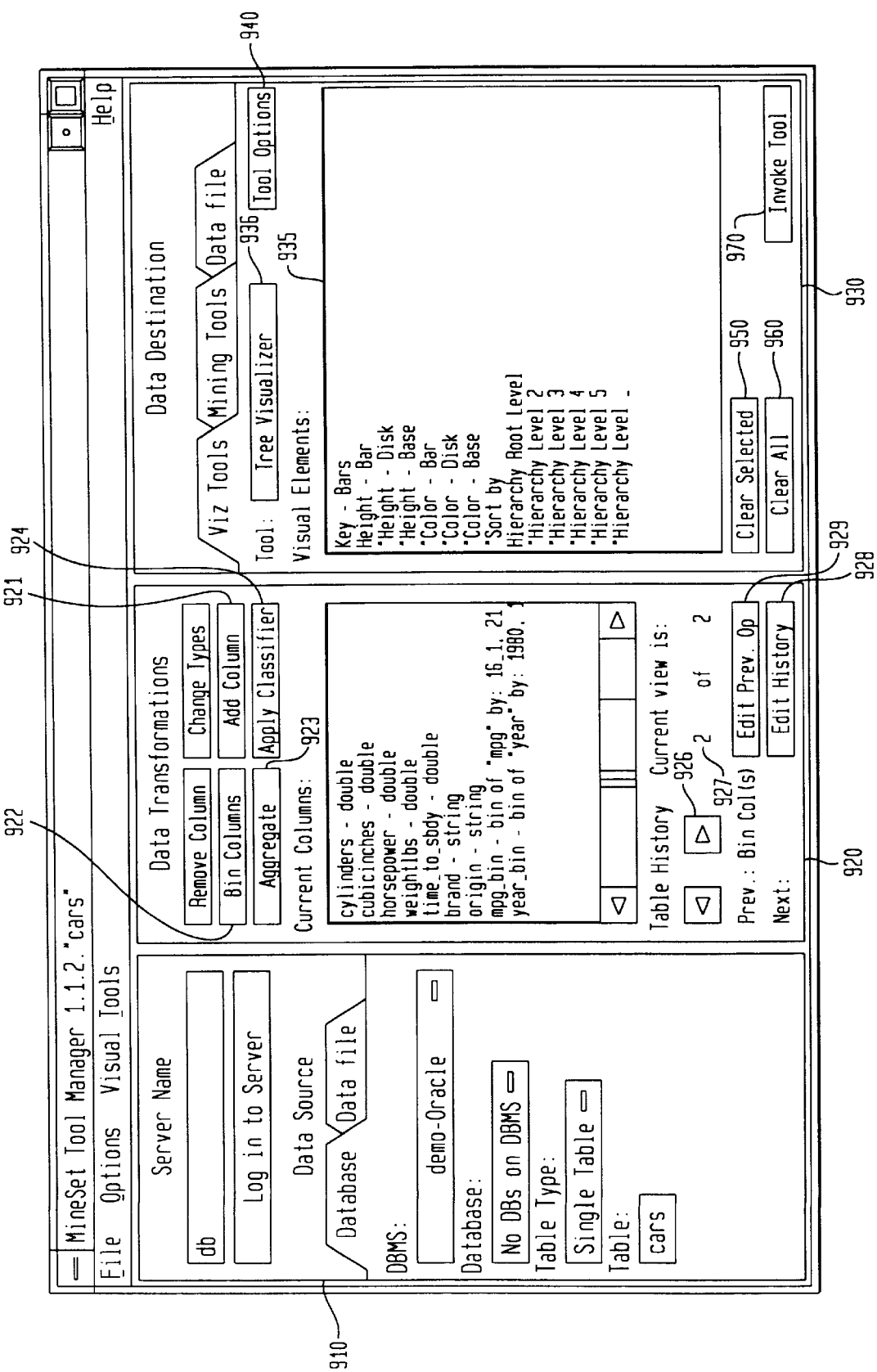

FIG. 9C shows data record transform panel 920 used with data destination panel 930 in which a tree visualizer is selected. The visual elements window 935 then lists the one or more graphical attributes (e.g. height of bars, color of bars, hierarchy levels) associated with objects in a tree data visualization. Optional items are preceded by an asterisk. For example, clicking Height-Bars lets a user specify the heights of bars on nodes in a tree data visualization. Clicking Color-Bars lets a user assign colors to the node bars.

Data transform panel 920 is described in further detail with respect to FIGS. 10A, 10B, and 11.

7. Transforming the Data

Data Transformations panel 920 lets a user manipulate the tables with which a user wants to work. After a user has selected a table (via the Server Name and Data Source panel described above), its column headings appear in the Current Columns window of the Data Transformations panel. The Data Transformation data manipulation options are as follows:

"Remove Columns" lets a user delete one or more columns that are not relevant to the current visualization or mining.

"Bin Columns" lets a user take a range of values and assign each record to a group (for example, with a range of ages, 0–18, 19–25, 26–35, and so on).

"Aggregate" lets a user find aggregations (sum, min, max, and so on), group data into new columns, or make arrays from a column indexed by other columns.

"Change Types" lets a user change a column's type.

"Add Column" lets a user add a new column based on a mathematical expression.

"Apply Classifier" lets a user use a previously created classifier on a table for labeling new records.

Binning

Binning lets a user sort the information from one or more columns into groups in a new column or columns (for example, with a range of ages, 0–18, 19–25, 26–35, and so on). Click Bin Column to get a dialog box 1000 that lets a user specify the binning options (FIG. 10A). Dialog box 1000 lets a user choose the column that is to be divided into bins, specify the name of the new column to contain values for the bins, set bin thresholds, or specify a range with thresholds at regular intervals.

To specify binning options for one or more columns, select the column name(s), a user chooses the appropriate options, and clicks the Apply button at the bottom of the dialog box 1000. If a user selects only one column for binning, the name of the resulting binned column appears in the New column name box, and a user can type in a new name. In the example shown in FIG. 10A, Age_Bin is the name for the new column; in this case, it provides a range of ages. If a user selects more than one column for binning, New column name stays inactive. Next to New column name is a check box labeled Delete original column. When chosen, this option automatically deletes the original column after binning. Click the check box to turn this function on or off.

In the middle of the Bin columns dialogue box 1000 are two tabs for choosing Automatic Thresholds (1020) or User Specified Thresholds (1010). Choosing Automatic Thresholds opens panel 1020 and instructs the computer to suggest the bins. Choosing User Specified Thresholds (1010) lets a user specify the thresholds. If the Automatic Thresholds tab is chosen, a program can use machine learning to suggest bins.

As shown in FIG. 10B, the first choice under Automatic Threshold Computation is between the Automatically choose number of bins and the Group into a number of bins buttons. Click Automatically choose number of bins to let the computer decide the best number of bins. If a user chooses to specify the number of bins, a user clicks Group into: _ bins, and types the number of bins wanted into the field.

In the Use approach menu, a user can choose between Uniform or Automatic binning. If a user chooses Uniform, the algorithm separates the interval into the specified number of bins; the range of the variable is separated into uniformly sized ranges. The upper and lower bounds for the extreme ranges include any values outside the ranges that were seen in the data. For example, if the values for an attribute are all in the range 5–14, and four ranges are chosen, the thresholds are 8 and 11, corresponding to these ranges:

$\leq 8$, $>8$ to $11$, $>11$ to $14$, $>14$

Uniform lets a user decide whether he or she wants to specify the number of intervals or let the algorithm select a number automatically. The automatic selection of the number of bins for the uniform thresholding is based on a number of bins related to the number of distinct values: the more distinct values, the more ranges are chosen (the relationship is logarithmic).

If a user chooses Automatic, a user also must select a discrete label. The thresholds are chosen so that the distributions of labels at different ranges are as different as possible. This approach continues to split ranges and create thresholds until no additional interval is considered significant. No interval is split if the two subintervals do not contain the minimum number of instances you can specify (this defaults to 5).

The Minimum # instances in any bin text field lets a user specify the minimum number of records in any bin; this prevents the creation of bins with fewer records than the number specified.

If a user clicks Apply, the Tool Manager picks bin thresholds and displays them in the Thresholds for selected column are text field. Output from the process of automatically computing bins appears in a pop-up window, showing progress of the algorithm and any errors that occur.

If a user specifies his or her own thresholds (as shown in FIG. 10A), a user can choose between Use custom thresholds or Use evenly spaced thresholds by clicking either button. Typing in the thresholds and clicking Apply makes those thresholds effective for the selected columns.

The Use custom thresholds text box lets a user enter the range criteria. For example, a user could enter the numbers 18, 30, 50, 60. This results in the following ranges: 0–18, 19–30, 31–50, 51–60, 61+. Note that a user enters only the digits and commas, not the ranges.

To specify equally spaced bins over a range of values, click the Equally Spaced Bins button. This activates the three text fields below it. A user can type the start of the binning range, the end of the range, and the spacing of the bins, respectively, into these fields. If a user is binning a column that is a date, a user can specify units of time for the bin spacing (using the Date units pop-up menu under the text fields). This would permit, for example, a user to bin a time period into bins of three weeks. Dates entered into these fields can be typed in the form "MM/DD/YY". Example time units are years, quarters, months, days, hours, minutes, seconds.

Aggregation

Before describing the features and effects of the Aggregate button, this section provides an introduction to the concept of arrays and distribution as used in the aggregation feature. The Aggregate button lets a user perform simple aggregations (for example, sum, min, max, and so on), make arrays and distribute columns.

Table 3-1 illustrates some sample aggregations/calculations.

TABLE 3-1

Aggregate Example 1

| State | Age_bin | Total $ Spent |
|---|---|---|
| CA | 0–20 | $50 |
| CA | 21–40 | $454 |
| CA | 41–60 | $693 |
| NY | 0–20 | $35 |
| NY | 21–40 | $541 |
| NY | 41–60 | $628 |

If a user makes Total $ Spent into an array indexed by the binned column Age bin, the resulting table, now with only two columns appear as shown in Table 3-2

TABLE 3-2

Aggregate Example 2

| State | Total $ Spent [Age_bin] |
|---|---|
| CA | [$50, $454, $693] |
| NY | [$35, $541, $628] |

In this case, making an array reduces the number of columns by one, and also reduces the number of rows by four. Arrays are useful for the Tree Visualizer tool; they are needed if a user want to use sliders in Scatter Visualizer and Map Visualizer displays.

Distributing columns is similar, but different in several important ways. Instead of producing a single new column holding many values, distributing produces one new column for each value of the index. For example, if in the first table Total $ Spent were not made an array, but instead distributed by Age_bin, Table 3-3 would be the result.

TABLE 3-3

Aggregate Example 3

| State | Total $_0–20 | Total $_21–40 | Total $_41–60 |
|---|---|---|---|
| CA | $50 | $454 | $693 |
| NY | $35 | $541 | $628 |

Thus, distributing increases the number of columns but decreases the number of rows. If a user has more than one binned column (for example, Age_bins and Sex_bin), you can make a two-dimensional array (indexed by combinations of Age_bin and Sex_bin). A user also can distribute and make an array at the same time.

Table 3-4 has two binned columns: one for age, one for sex.

TABLE 3-4

Example of binning

| State | Age_bin | Sex_bin | Total $ Spent |
|---|---|---|---|
| CA | 0–20 | 1 | $20 |
| CA | 0–20 | 2 | $30 |
| CA | 21–40 | 1 | $220 |
| CA | 21–40 | 2 | $234 |
| CA | 41–60 | 1 | $401 |
| CA | 41–60 | 2 | $292 |

If a user make Total $ Spent an array indexed by age, and remove Sex_bin, the results are shown in Table 3-5.

TABLE 3-5

Results When Making

| State | Total $ Spent [Age_bin] |
|---|---|
| CA | [$50, $454, $693] |

If a user does not remove Sex_bin, the results are shown in Table 3-6.

TABLE 3-6

Results When Specifying Sex_bin

| State | Sex_bin | Total $ Spent [Age_bin] |
|---|---|---|
| CA | 1 | [$20, $220, $401] |
| CA | 2 | [$30, $234, $292] |

If a user makes an array by both Age_bin and Sex_bin, the results are shown in Table 3-7.

TABLE 3-7

Results of Making an Array by

| State | Total $ Spent [Age_bin][Sex_bin] |
|---|---|
| CA | [$20, $220, $401, $30, $234, $292] |

Finally, if a user distributes by Sex_bin and index by Age_bin, the results are shown in Table 3-8.

TABLE 3-8

Results of Distributing Sex_bin and Indexing by Age_bin

| State | Total $ Spent [Age_bin], Sex = 1 | Total $ Spent [Age_bin], Sex = 2 |
|---|---|---|
| CA | [$20, $220, $401] | [$30, $234, $292] |

The examples above (with the exception of Table 3-5) had exactly one relevant value for each array element, and the distribution merely rearranged existing data values. In example of Table 3-5, there were two data values for each array element, and these were added. Several aggregation options for data sets contain more than one value to be distributed into a given output array element. The most common option is to add the values (as done in Table 3-5). This is useful when accumulating expenditures into budgets, for example. A user also can take the minimum, maximum, and average of total number of values, as well as count them. When distributing values for a given data set, it is possible that there are no values appropriate for a particular bin. In this case, for MIN, MAX, AVG, and SUM aggregations, the Data mover fills in a value of Null. For COUNT aggregations, the Data mover fills in a value of 0.

The Aggregate Button

A user can use the Aggregate button to create simple aggregations, make arrays, or distribute columns. Clicking this button causes the Aggregate dialog box to appear (FIG. 11). It shows three lists, with the columns in the current table appearing in the middle list. If a user wants to aggregate, distribute, or turn a column into an array, select the name of the column, and click the left arrow button between the left and center lists. Below are pop-up menus that let a user specify indexes (if the result is to be an array) and a distribution column (if the result is to be distributed). In addition, at the bottom of the dialog box are five toggles that let a user specify how different values are to be combined when aggregated: either summed, averaged, the min or max value, or the count. When a user is aggregating number-valued columns, a user can choose any combination of these options. For other types, only count is permitted. If a user chooses more than one option, a user gets more than one result. For example, selecting average and max gives a user one result with average values, and another one holding the max values.

In Aggregate dialog box 1100, the three lists of column names are given below:

Columns to aggregate.

Group-By columns (the default); this keeps the columns unchanged throughout the operation. For each set of records with the same combination of values in the Group-By columns, only one record is output in the resulting table, with values in the aggregated columns summed, averaged, minned, maxed, or counted (depending on the check boxes at the bottom of the panel).

Columns to remove, as can be seen with the Sex_bin column in Table 3-5. After a user has finished with the additional aggregate criteria dialog box, the Current Columns text box in the Table Processing window shows the new column names that result from applying these criteria.

8. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system for transforming a stream of sorted input data records into an aggregate record, each input data record including at least one group-by field, at least one field to be binned, and at least one value field, and each aggregate record including at least one group-by field and an aggregation result field, wherein the input data record group-by field stores data to be matched against data stored in the aggregate record group-by field, wherein the input data records are sorted by the data in the group-by field, wherein the value field stores data to be aggregated, and wherein the aggregation result field includes at least one location and stores aggregated data in a histogram format, the system comprising:

a binning module that, for each input data record in the stream, evaluates data in the input data record field to be binned to determine a bin-index value, wherein the bin-index value identifies locations of the aggregation result field the value field data should be aggregated into; and a histogram aggregation module that, for each input data record in the stream, aggregates the value field data into the aggregation result field location identified by the bin-index value, when data in the input data record group-by field matches data in the aggregate record group-by field.

2. The system of claim 1, further comprising:

an output module that outputs the aggregated data in the histogram format stored in the aggregation result field of the aggregate record once data in the input data record group-by field does not match data in the aggregate record group-by field.

3. A method for transforming a stream of sorted input data records into an aggregate record, each input data record including at least one group-by field, at least one field to be binned, and at least one value field, and each aggregate record including at least one group-by field and an aggregation result field, wherein the input data record group-by field stores data to be matched against data stored in the aggregate record group-by field, wherein the input data records are sorted by the data in the group-by field, wherein the value field stores data to be aggregated, and wherein the aggregation result field includes at least one location and stores aggregated data in a histogram format, the method comprising the steps of:

evaluating, for each input data record in the stream, data in the input data record field to be binned to determine a bin-index value, wherein the bin-index value identifies locations of the aggregation result field the value field data should be aggregated into; and for each input data record in the stream, aggregating the value field data into the aggregation result field location identified by the bin-index value, when data in the input data record group-by field matches data in the aggregate record group-by field.

4. The method of claim 3, further comprising the steps of:

outputting the aggregated data in the histogram format stored in the aggregation result field of the aggregate record once data in the input data record group-by field does not match data in the aggregate record group-by field; and re-initializing the aggregate record, wherein the data in the aggregate record group-by field is set equal to the data in the input data record group-by field and data in each location of the aggregation result field is set to null.

5. A computer program product comprising a computer useable medium having computer program logic recorded thereon for enabling a processor in a computer system to transform a stream of sorted input data records into an aggregate record, each input data record including at least one group-by field, at least one field to be binned, and at least one value field, and each aggregate record including at least one group-by field and an aggregation result field, wherein the input data record group-by field stores data to be matched against data stored in the aggregate record group-by field, wherein the input data records are sorted by the data in the group-by field, wherein the value field stores data to be aggregated, and wherein the aggregation result field includes at least one location and stores aggregated data in a histogram format, the computer program logic comprising:

means for enabling the processor, for each input data record in the stream, to evaluate data in the input data record field to be binned to determine a bin-index value, wherein the bin-index value identifies locations of the aggregation result field the value field data should be aggregated into; and means for enabling the processor, for each input data record in the stream, to aggregate the value field data into the aggregation result field location identified by the bin-index value, when data in the input data record group-by field matches data in the aggregate record group-by field.

6. The computer program product of claim 5, wherein the computer program logic further comprises:

means for enabling the processor to output the aggregated data in the histogram format stored in the aggregation result field of the aggregate record once data in the input data record group-by field does not match data in the aggregate record group-by field; and means for enabling a processor to re-initialize the aggregate record, wherein the data in the aggregate record group-by field is set equal to the data in the input data record group-by field and data in each location of the aggregation result field is set to null.

7. A system for transforming a stream of input data records into a partially aggregated record, each input data record including at least one group-by field, at least one field to be binned, and at least one value field, and each partially aggregated record including at least one group-by field and an aggregation result field, wherein the input data record group-by field stores data to be matched against data stored in the partially aggregated record group-by field, wherein the value field stores data to be aggregated, and wherein the aggregation result field includes at least one location and stores aggregated data in a histogram format, the system comprising:

a binning module that, for each input data record in the stream, evaluates data in the input data record field to be binned to determine a bin-index value, wherein the bin-index value identifies locations of the aggregation result field the value field data should be aggregated into; and a histogram aggregation module that, for each input data record in the stream, aggregates the value field data into the aggregation result field location identified by the bin-index value, when data in the input data record group-by field matches data in the partially aggregated record group-by field.

8. A method for transforming a stream of input data records into a partially aggregated record, each input data record including at least one group-by field, at least one field to be binned, and at least one value field, and each partially aggregated record including at least one group-by field and an aggregation result field, wherein the input data record group-by field stores data to be matched against data stored in the partially aggregated record group-by field, wherein the value field stores data to be aggregated, and wherein the aggregation result field includes at least one location and stores aggregated data in a histogram format, the method comprising the steps of:

evaluating, for each input data record in the stream, data in the input data record field to be binned to determine a bin-index value, wherein the bin-index value identifies locations of the aggregation result field the value field data should be aggregated into; and for each input data record in the stream, aggregating the value field data into the aggregation result field location identified by the bin-index value, when data in the input data record group-by field matches data in the partially aggregated record group-by field.

9. The method of claim 8, further comprising the steps of:

creating a partially aggregated record when the data in the input data record group-by field does not match with any of the data in the existing partially aggregated records group-by fields, wherein the data in the created partially aggregated record group-by field is set equal to the data in the input data record group-by field and data in each location of the aggregation result field of the created partially aggregated record is set to null; and outputting the aggregated data in the histogram format stored in the aggregation result field of each partially aggregated record once all of the input data records have been processed.

10. A system for transforming a stream of sorted input data records into an aggregate record, each input data record including at least one group-by field, at least one field to be binned, and at least one value field, and each aggregate record including at least one group-by field and an aggregation result field, wherein the input data record group-by field stores data to be matched against data stored in the aggregate record group-by field, wherein the value field stores data to be aggregated, and wherein the aggregation result field includes at least one location and stores aggregated data in a histogram format, the system comprising:

evaluating means for evaluating each input data record in the stream, the evaluating means evaluates data in the input data record field to be binned to determine a bin-index value, wherein the bin-index value identifies locations of the aggregation result field the value field data should be aggregated into;

histogram aggregation means that, for each input data record in the stream, aggregates the value field data into the aggregation result field location identified by the bin-index value, when data in the input data record group-by field matches data in the aggregate record group-by field; and a graphical user-interface means for providing parameters for the histogram aggregation means, the parameters identifying a selected histogram aggregation operation and selected group-by fields.

11. A system for transforming a stream of input data records into a partially aggregated record, each input data record including at least one group-by field, at least one field to be binned, and at least one value field, and each partially aggregated record including at least one group-by field and an aggregation result field, wherein the input data record group-by field stores data to be matched against data stored in the partially aggregated record group-by field, wherein the value field stores data to be aggregated, and wherein the aggregation result field includes at least one location and stores aggregated data in a histogram format, the system comprising:

an evaluating means that, for each input data record in the stream, evaluates data in the input data record field to be binned to determine a bin-index value, wherein the bin-index value identifies locations of the aggregation result field the value field data should be aggregated into; and a histogram aggregation means that, for each input data record in the stream, aggregates the value field data into the aggregation result field location identified by the bin-index value, when data in the input data record group-by field matches data in the partially aggregated record group-by field.

12. The system of claim 11, further comprising a graphical user-interface means that provides parameters for the histogram aggregation means, the parameters identifying a selected histogram aggregation operation and selected group-by fields.

13. The system of claim 12, wherein the graphical user-interface means displays an aggregate panel, the aggregate panel including three windows for displaying columns to aggregate, group-by columns, and columns to remove, a first group of boxes for choosing at least one index for columns to aggregate and distribution columns, and a second group of boxes for selecting the histogram aggregation operation from a group of histogram aggregation operations.

14. The system of claim 13, wherein the group of histogram aggregation operations include at least one of determining a sum, maximum, minimum, count, and average.

15. A computer program product comprising a computer useable medium having computer program logic recorded thereon for enabling a processor in a computer system to transform a stream of input data records into a partially aggregated record, each input data record including at least one group-by field, at least one field to be binned, and at least one value field, and each partially aggregated record including at least one group-by field and an aggregation result field, wherein the input data record group-by field stores data to be matched against data stored in the partially aggregated record group-by field, wherein the value field stores data to be aggregated, and wherein the aggregation result field includes at least one location and stores aggregated data in a histogram format, the computer program logic comprising:

means for enabling the processor, for each input data record in the stream, to evaluate data in the input data record field to be binned to determine a bin-index value, wherein the bin-index value identifies locations of the aggregation result field the value field data should be aggregated into; and means for enabling the processor, for each input data record in the stream, to aggregate the value field data into the aggregation result field location identified by the bin-index value, when data in the input data record group-by field matches data in the partially aggregated record group-by field.

16. The computer program product of claim 15, wherein the computer program logic further comprises:

means for creating a partially aggregated record when the data in the input data record group-by field does not match with any of the data in the existing partially aggregated records group-by fields, wherein the data in the created partially aggregated record group-by field is set equal to the data in the input data record group-by field and data in each location of the aggregation result field of the created partially aggregated record is set to null; and means for outputting the aggregated data in the histogram format stored in the aggregation result field of each partially aggregated record once all of the input data records have been processed.

17. A system for transforming a stream of sorted input data records into an aggregate record, each input data record including at least one field to be binned and at least one value field, and each aggregate record including an aggregation result field, wherein the value field stores data to be aggregated, and wherein the aggregation result field includes at least one location and stores aggregated data in a histogram format, the system comprising:

a binning module that, for each input data record in the stream, evaluates data in the input data record field to be binned to determine a bin-index value, wherein the bin-index value identifies locations of the aggregation result field the value field data should be aggregated into; and a histogram aggregation module that, for each input data record in the stream, aggregates the value field data into the aggregation result field location identified by the bin-index value.

18. A system for transforming a stream of input data records into a partially aggregated record, each input data record including at least one field to be binned and at least one value field, and each partially aggregated record including an aggregation result field, wherein the value field stores data to be aggregated, and wherein the aggregation result field includes at least one location and stores aggregated data in a histogram format, the system comprising:

a binning module that, for each input data record in the stream, evaluates data in the input data record field to be binned to determine a bin-index value, wherein the bin-index value identifies locations of the aggregation result field the value field data should be aggregated into; and a histogram aggregation module that, for each input data record in the stream, aggregates the value field data into the aggregation result field location identified by the bin-index value.

* * * * *